(12) United States Patent
Miura

(10) Patent No.: US 6,771,273 B2
(45) Date of Patent: Aug. 3, 2004

(54) IMAGE DISPLAY APPARATUS

(75) Inventor: Mikio Miura, Sagmihara (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 10/188,742

(22) Filed: Jul. 5, 2002

(65) Prior Publication Data
US 2003/0020722 A1 Jan. 30, 2003

(30) Foreign Application Priority Data

Jul. 6, 2001 (JP) .......................................... 2001-206448
Sep. 14, 2001 (JP) .......................................... 2001-280647

(51) Int. Cl.$^7$ ................................................. G09G 5/00
(52) U.S. Cl. ....................... 345/588; 382/181; 382/232; 382/245
(58) Field of Search .................................. 345/560, 588; 704/243, 244; 382/181, 194, 209, 232, 233, 234, 245

(56) References Cited

U.S. PATENT DOCUMENTS 5,131,079 A      7/1992   Miyawaki et al.
6,289,125 B1 *   9/2001   Katoh et al. .................. 382/194
6,317,512 B1 *  11/2001   Maeda et al. ................. 382/141
6,507,415 B1 *   1/2003   Toyoda et al. ................ 358/450

* cited by examiner

Primary Examiner—Matthew C. Bella
Assistant Examiner—Mackly Monestime
(74) Attorney, Agent, or Firm—Oblon, Spivak, McClelland, Maier & Neustadt, P.C.

(57) ABSTRACT

An image display apparatus comprises a line buffer unit which stores binary image data, the binary image data being divided into a plurality of line portion data, each line portion data having a fixed length. Pattern matching units are connected in parallel with the line buffer unit and receives the line portion data respectively, each pattern matching unit determining whether an input pattern of a related line portion data matches with one of reference patterns. When the match occurs each pattern matching unit outputs a truth signal indicating the value one, and otherwise each pattern matching unit outputs a falseness signal indicating the value zero. A judgment unit receives the truth or falseness signals from the pattern matching units and determines how many times the match with respect to one of the reference patterns occurs in succession based on the received signals, the judgment unit encoding lengths of runs for the line portion data having the fixed length based on results of the determination and storing the codes in the video memory.

8 Claims, 37 Drawing Sheets

| NC22 | nBMRL3 | NCODE2_1 | NCODE3_1 | NCODE3_2 |
|---|---|---|---|---|
| 0 | 0 | 0 | 0 | 0 |
| 0 | 0 | 1 | 1 | 0 |
| 0 | 1 | 0 | 1 | 0 |
| 1 | X | X | 0 | 1 |
| 0 | 1 | 1 | 0 | 0 |

| NC32 | BRL2_3 | NCODE3_2 | nBMRL4 | NCODE3_1 | NCODE4_1 | NCODE4_2 | NCODE4_3 |
|---|---|---|---|---|---|---|---|
| 0 | 0 | 0 | 0 | 0 | 0 | 0 | 0 |
| X | 0 | X | 0 | 1 | 1 | 0 | 0 |
| X | X | 0 | 1 | 0 | 1 | 0 | 0 |
| X | X | 1 | 1 | 1 | 0 | 1 | 0 |
| X | 1 | X | 0 | X | 0 | 1 | 0 |
| X | X | X | X | X | 0 | 1 | 0 |
| 1 | X | X | X | X | 0 | 0 | 1 |
| 0 | 0 | 1 | 1 | 0 | 0 | 0 | 0 |

NCODE5 SEL block: inputs NC42, BRL3_3, NCODE4_3, BRL2_4, NCODE4_2, nBMRL5, NCODE4_1; outputs NCODE5_1, NCODE5_2, NCODE5_3, NCODE5_4

Table 2501:

| NC42 | BRL3_3 | NCODE4_3 | BRL2_4 | NCODE4_2 | nBMRL5 | NCODE4_1 | NCODE5_1 | NCODE5_2 | NCODE5_3 | NCODE5_4 |
|---|---|---|---|---|---|---|---|---|---|---|
| 0 | 0 | 0 | 0 | 0 | 0 | 0 | 0 | 0 | 0 | 0 |
| X | X | X | 0 | X | 0 | 1 | 1 | 0 | 0 | 0 |
| X | X | 0 | X | 0 | 1 | 0 | 1 | 0 | 0 | 0 |
| X | X | X | X | 1 | 1 | 1 | 0 | 1 | 0 | 0 |
| X | 0 | X | 1 | 0 | 0 | X | 0 | 1 | 0 | 0 |
| X | X | X | X | 1 | 1 | X | 0 | 0 | 1 | 0 |
| X | X | X | 1 | 1 | X | X | 0 | 1 | 1 | 0 |
| X | 1 | X | X | X | 0 | X | 0 | 1 | 1 | 0 |
| X | X | X | X | X | X | X | 0 | 1 | 1 | 0 |
| 1 | X | 1 | 0 | 1 | 1 | X | 0 | 0 | 1 | 1 |
| 0 | 0 | 1 | 0 | 1 | 1 | 0 | 0 | 0 | 0 | 0 |

| | CODE8 SEL | | | | | | |
|---|---|---|---|---|---|---|---|
| | LD8 | all0rl1 | all1rl1 | all2rl1 | all3rl1 | OTHER | EOD |
| NCOR72 | 1 | 0 | 0 | x | 1 | | |
| BM8 | x | 0 | 0 | 0 | x | 0 | x |
| RL108 | x | 1 | 0 | 0 | x | 0 | x |
| RL118 | x | x | 1 | 0 | x | 0 | x |
| RL128 | x | x | x | 1 | x | 0 | x |
| RL138 | x | x | x | x | 1 | 0 | x |
| nBMRL8 | | | x | 1 | x | x | x |
| NCODE7_1 | | | x | 1 | x | x | x |
| NCODE7_2 | | | x | x | 1 | x | x |
| NCODE7_3 | | | x | x | x | 1 | x |
| NCODE7_4 | | | x | x | x | x | x |
| NCODE7_5 | | | x | x | x | x | 1 |
| NCODE7_6 | | | x | x | x | x | x |
| | | | | | | 0 | 1 |

| A | X | 1 |
|---|---|---|
| B | 0 | X |
| C | 0 | X |
|   | Y ||

IMAGE DISPLAY APPARATUS

BACKGROUND OF THE INVENTION

1. Field of the Invention

The present invention relates to an image display apparatus that utilizes a display, such as CRT (cathode ray tube) display, LC (liquid crystal) display, etc., which is provided in an information processing apparatus.

2. Description of the Related Art

An image display apparatus, which is used by an information processing apparatus, includes a video memory that stores image data which is output to a display device for image representation. Furthermore, an image display apparatus, which is used by an image-processing apparatus or image-forming apparatus, such as a facsimile, a digital copier or printer, also includes a video memory that stores image data being output to a display device for image representation.

In the video memory, if image data is stored therein as bit map data, the memory areas are wasted due to the influences of entropy redundancy contained in the bit map data. For example, the screen size of a VGA (video graphics array) monochrome display is 640 dots by 480 lines. If the white data or black data of many lines used as a background color continues and it is stored as bitmap data, the memory areas in the size of 640 dots by the number of the lines will be occupied.

Generally, the amount of information contained in image data is huge even if it is not the image data for displaying an image. If the image data is stored in a video memory by treating it in a non-compression state, the amount of the image data being stored in the video memory becomes huge. In such a case, many memory areas are needed for the storage and the cost will be increased significantly.

To avid this, when storing image data in a memory, coding compression of the image data is carried out. The amount of image data can be reduced to a certain degree by the compression, and there are various compression techniques that have been proposed to deal with image data and compression techniques combining conversion coding and arithmetic coding, such as MH coding technique, MMR coding technique, JPEG, JBIG, etc.

However, much processing time is needed on the occasion of coding or decoding in the case of the conventional coding/compression method. The conventional coding/compression method needs complicated coding processing must be accompanied with judgment processing and arithmetic operation processing. For example, a QM coder which uses an arithmetic coding technique must perform complicated processes, and the processing speed is slow.

Moreover, the conventional coding compression method is widely used in the field of image transmission by facsimile, and in order to improve the rate of compression, there is a tendency that it uses processing on the basis of page.

When taking out partially the stored image data and decoding it, or when editing the stored image data, it will be necessary to decode a large amount of image data other than the subject image data. In such a case, unnecessary processing time will be spent. The conventional coding compression method is not suitable for decoding or editing an arbitrary portion of the stored image data.

Furthermore, in the conventional coding technique which improves the degree of redundancy, the coding is performed by one-by-one calculations of run lengths, which are the length of a sequence (run) of the same data pattern. Even if it is hardware coding/decoding equipment, the processing time of a number of clocks (several clocks or several tens of clocks) is needed for outputting a run-length code.

When the conventional coding/decoding method is applied to storage of display data (image data) in a video memory, the processing time that is several tens or thousands of times as large as that of the conventional method using the bitmap data storage for editing will be needed. And the speed of image drawing will be lowered.

Moreover, in a conventional coding/decoding apparatus of a display device for binary image data, the image data is divided into data blocks each having a fixed length, and the parallel processing of pattern matching for the data blocks is carried out. The display image is stored in a video memory with the coding method which determines run-length codes and carries out the entropy coding from the matching results. At the time of decoding, the encoded image data is decoded to the original image data by the parallel processing and reverse conversion.

However, there is not any concrete image display method that can rearrange the codes indicating the run lengths quickly and store the encoded image data in a video memory. Moreover, there is not any concrete method which can discriminate the run-length code and the bitmap data.

Furthermore, the patterns which are optimal for use in the pattern matching processing are varied depending on the kind of applications. Even if the patterns are considered to be optimal for a certain application, they are not the optimal one when they are applied to another application. In such a case, the rate of compression of image data will be lowered.

SUMMARY OF THE INVENTION

An object of the present invention is to provide an improved image display apparatus in which the above-described problems are eliminated.

Another object of the present invention is to provide an image display apparatus which is able to perform the encoding of image data more speedily than the conventional method when effective use of the video memory is promoted, and provides a capability of image data conversion to instantaneously perform the encoding.

The above-mentioned objects of the present invention are achieved by an image display apparatus which encodes image data and stores the encoded image data into a video memory, and reads the image data from the video memory and decodes the read image data, comprising: a line buffer unit storing binary image data which is received at an input thereof, the binary image data being divided into a plurality of line portion data, each line portion data having a fixed length; a plurality of pattern matching units connected in parallel with the line buffer unit and receiving the plurality of line portion data respectively, each pattern matching unit determining whether an input pattern of a related line portion data matches with a corresponding one of a plurality of reference patterns, wherein, when the match occurs each pattern matching unit outputs a truth signal indicating the value one, and otherwise each pattern matching unit outputs a falseness signal indicating the value zero; and a judgment unit receiving the truth or falseness signals from the plurality of pattern matching units and determining how many times the match with respect to one of the plurality of reference patterns occurs in succession, based on the received signals, the judgment unit encoding lengths of runs for the plurality of line portion data having the fixed length based on results of the determination and storing the codes in the video memory.

According to the image display apparatus of the present invention, it is possible to perform the encoding of image data more speedily than the conventional method when effective use of the video memory is promoted, and image drawing processing equivalent to the conventional image drawing method that does not use the coding/decoding technique is possible. The image display apparatus of the present invention can make effective use of the video memory, and can remarkably reduce the video memory capacity of an information processing apparatus.

BRIEF DESCRIPTION OF THE DRAWINGS

Other objects, features and advantages of the present invention will be apparent from the following detailed description when read in conjunction with the accompanying drawings.

FIG. 29 is a diagram for explaining a function of the internal circuit ENCODE1 SEL of FIG. 28.

FIG. 31 is a diagram for explaining a function of the internal circuit ENCODE8 SEL of FIG. 30.

FIG. 33 is a diagram for explaining a function of the internal circuit ENCODE5 SEL of FIG. 32.

FIG. 34 is a diagram for explaining a function of an OR logic used in the truth tables of FIG. 31 and FIG. 33.

DETAILED DESCRIPTION OF PREFERRED EMBODIMENTS

A description will now be provided of preferred embodiments of the present invention with reference to the accompanying drawings.

Figure 1:
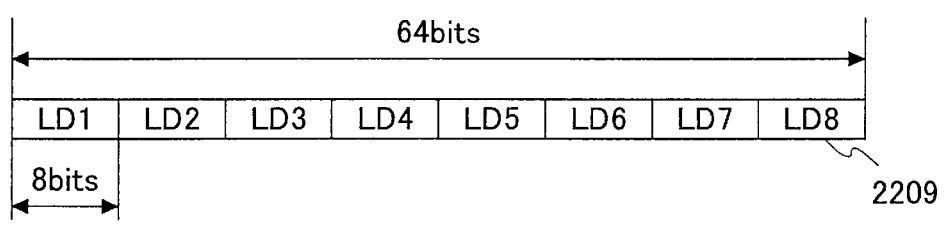
FIG. 1 is a diagram for explaining a structure of a line buffer in the image display apparatus to which a first preferred embodiment of the present invention is applied.

A first preferred embodiment of the image display apparatus of the present invention will be described. FIG. 1 shows a structure of a line buffer in the image display apparatus to which the first preferred embodiment of the present invention is applied.

Figure 2:
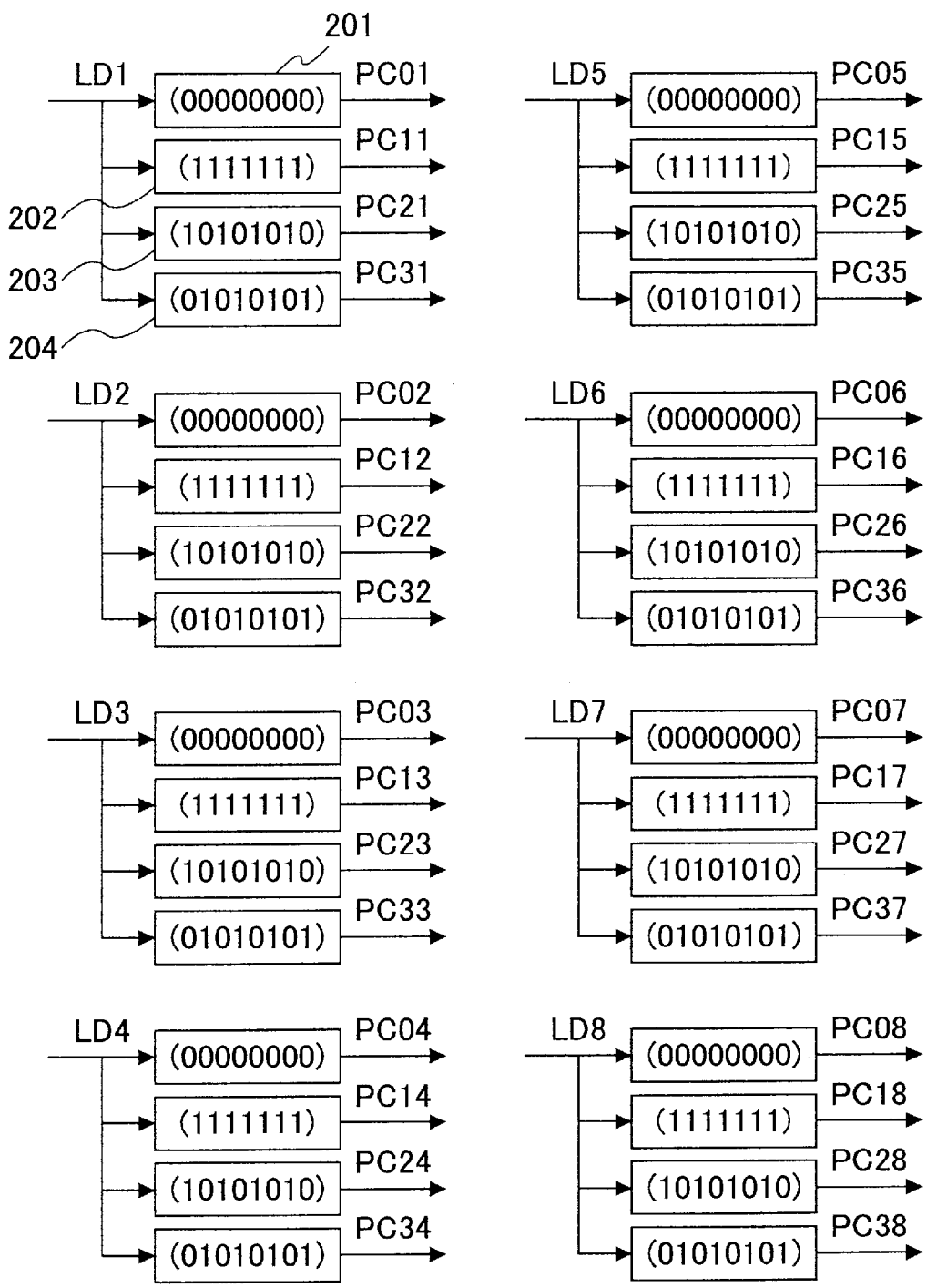
FIG. 2 is a diagram of a pattern comparator unit in the image display apparatus of the first preferred embodiment.
Figure 3:
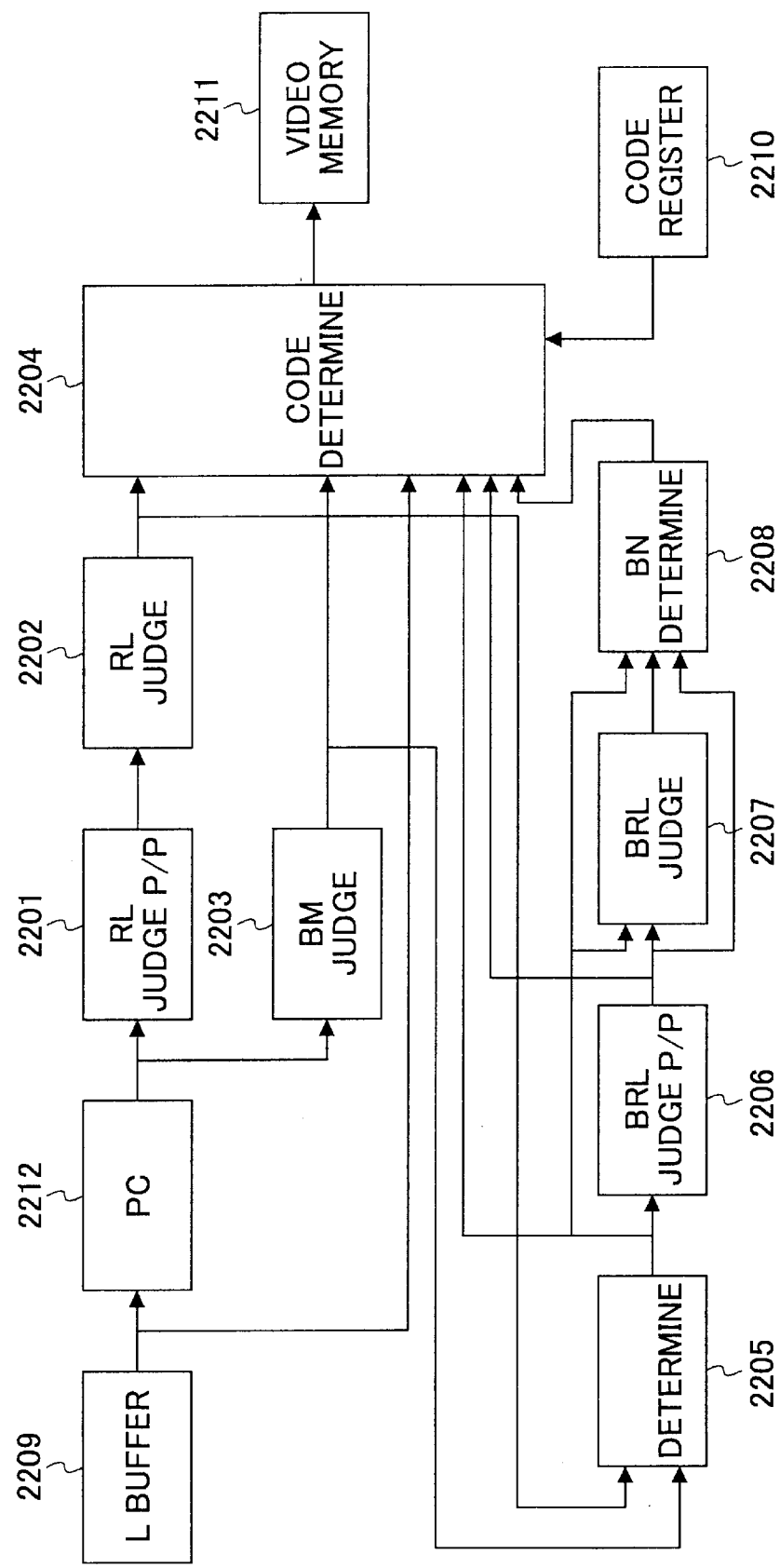
FIG. 3 is a block diagram of the image display apparatus of the first preferred embodiment.

FIG. 2 shows a pattern comparator unit in the image display apparatus of the first preferred embodiment. FIG. 3 shows the configuration of the entire image display apparatus of the first preferred embodiment.

Generally, the screen size of a VGA display is 640 dots in horizontal direction by 480 dots in vertical direction. In the present embodiment, however, for the sake of simplicity of description, it is assumed that the data width that is treated at a time is set to 64 bits as shown in FIG. 1, and the minimum unit of coding is 8 bits.

An image drawing is performed by an external host CPU (central processing unit), which is initiated by software processing of the image display apparatus. The image data is formed into binary image data, and it is temporarily stored in a 64-bit line buffer (L BUFFER) 2209 in FIG. 3. In the line buffer 2209, the 64-bit image data is divided into a number of 8-bit line portion data LD1–LD8. Each of the line portion data LD1–LD8 is the minimum unit of coding.

As shown in FIG. 2, a pattern comparator unit (PC) 2212 of FIG. 3 includes 8 blocks of four pattern comparators 201–204 which are connected in parallel with the line buffer 2209. The eight line portion data LD1–LD8 from the line buffer 2209 are supplied to the eight blocks of the pattern comparator unit 2212, respectively. Each line portion data is input to the pattern comparators 201–204 of the associated one of the eight blocks.

In the present embodiment, as shown in FIG. 2, the four kinds of pattern comparators 201–204 are provided for each block. However, in FIG. 3, the pattern comparator unit 2212 in the image display apparatus is shown as a single block for the sake of convenience.

Specifically, the pattern comparator 201 is provided to perform matching of the input pattern of the related line portion data with a reference pattern in which all the bits are set to "0"s. The pattern comparator 202 is provided to perform matching of the input pattern of the related line portion data with a reference pattern in which all the bits are set to "1"s. The pattern comparator 203 is provided to perform matching of the input pattern of the related line portion data with a reference pattern in which all the bits are set to a repetition of "10"s. The pattern comparator 204 is provided to perform matching of the input pattern of the related line portion data with a reference pattern in which all the bits are set to a repetition of "01"s.

The outputs PC01–PC08 of the pattern comparators 201 for the respective line portion data LD1–LD8, the outputs PC11–PC18 of the pattern comparators 202 for the respective line portion data LD1–LD8, the outputs PC21–PC28 of the pattern comparators 203 for the respective line portion data LD1–LD8, and the outputs PC31–PC38 of the pattern comparators 204 for the respective line portion data LD1–LD8 are set to a signal indicating the value 1 (truth) when the match occurs. Otherwise each output of these pattern comparators is set to a signal indicating the value 0 (false) when the match does not occurs.

The output signals from each of the pattern comparators 201–204 are supplied to the run-length judgment preprocessing part (RL JUDGE P/P) 2201 of FIG. 3. FIG. 4 through FIG. 7 show the internal circuits of the run-length judgment preprocessing part 2201 to which the respective outputs from the pattern comparators 201–204 are supplied.

Figure 4:
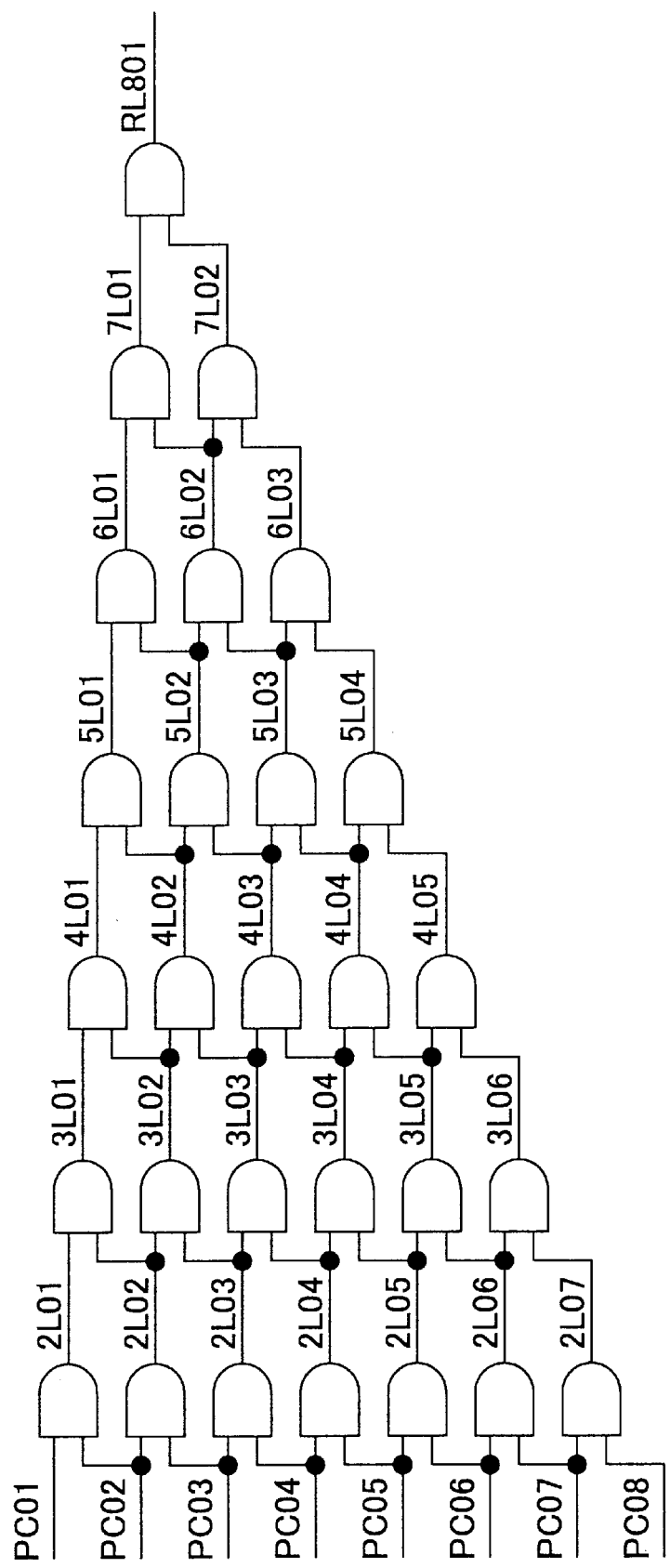
FIG. 4 is a diagram of an internal circuit of a run-length judgment preprocessing part in the image display apparatus of the first preferred embodiment.

The comparison results PC01–PC08 with the pattern of all "0"s are supplied to the internal circuit of the run-length judgment preprocessing part 2201 of FIG. 4. The comparison results PC11–PC18 with the pattern of all "1"s are supplied to the internal circuit of the run-length judgment preprocessing part 2201 of FIG. 5. The comparison results PC21–PC28 with the pattern having the repetition of "10"s are supplied to the internal circuit of the run-length judgment preprocessing part 2201 of FIG. 6. The comparison results PC31–PC38 with the pattern having the repetition of "01"s are supplied to the internal circuit of the run-length judgment preprocessing part 2201 of FIG. 7.

As shown in FIG. 4 through FIG. 7, the AND of the comparator outputs of the adjacent lines is taken, and the AND of this AND gate output and the adjacent AND gate output is further taken. The number of the AND gates arrayed in parallel at the same step decreases by one-every time the following step is taken. In the preprocessing part 2201, the output signals RL801, RL811, RL821 and RL831 of the final-step AND gates are thus obtained.

For example, in the internal circuit of FIG. 4, the output signal RL801 of the final-step AND gate is obtained as the result of taking the AND of the comparator outputs PC01–PC08 repeatedly.

In the present embodiment, the arrangement of the AND gates as shown in FIG. 4 through FIG. 7 is called the convergence chain type OR circuit. Similarly, the arrangement of OR gates connected in the same manner as mentioned above is called the convergence chain type AND circuit.

The outputs of the pattern comparators 201–204 and the AND outputs of the respective steps indicate the presence of a sequence (run) of the same pattern, but the preprocessing part 2201 of this stage cannot determine the length of such run (run length) with the internal circuits of FIG. 4 through FIG. 7.

Next, the outputs of the pattern comparators 201–204 and the AND outputs of each stage of FIG. 4 through FIG. 7 which indicate the presence of the run as mentioned above are supplied to the run-length judgment circuit (RL JUDGE) 2202 of FIG. 3.

FIG. 8 through FIG. 11 show the internal circuits of the run-length judgment circuit 2202 in the first preferred embodiment.

Figure 8:
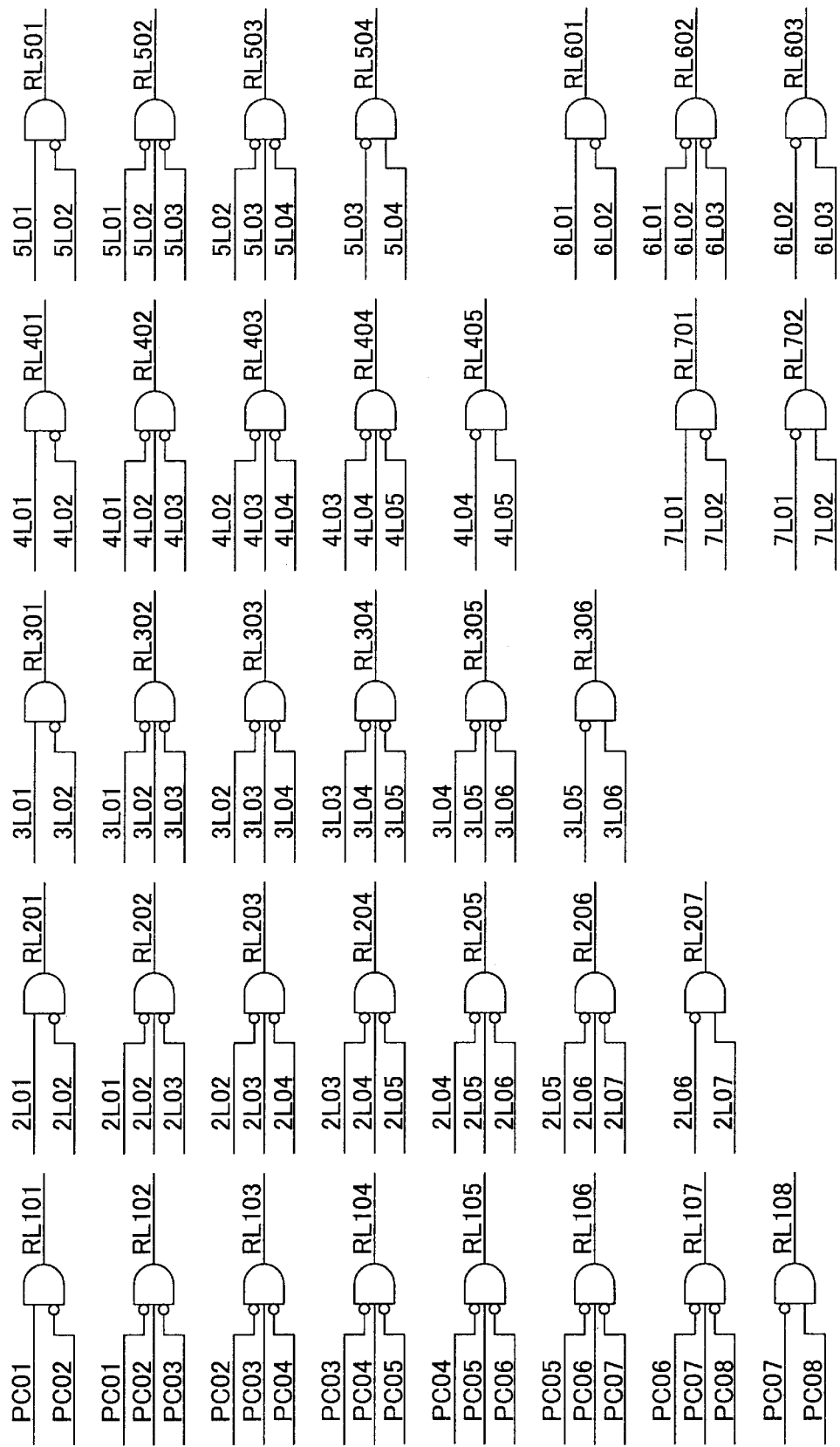
FIG. 8 is a diagram of an internal circuit of a run-length judgment circuit in the image display apparatus of the first preferred embodiment.

The internal circuit of the run-length judgment circuit 2202 of FIG. 8 receives the comparison results PC01–PC08 with the reference pattern of "0"s, and receives the signals 2L01 to 2L07, 3L01 to 3L06, 4L01 to 4L05, 5L01 to 5L04, 6L01 to 6L03, and 7L01 to 7L02 output from the run-length judgment preprocessing part 2201 of FIG. 4.

Figure 5:
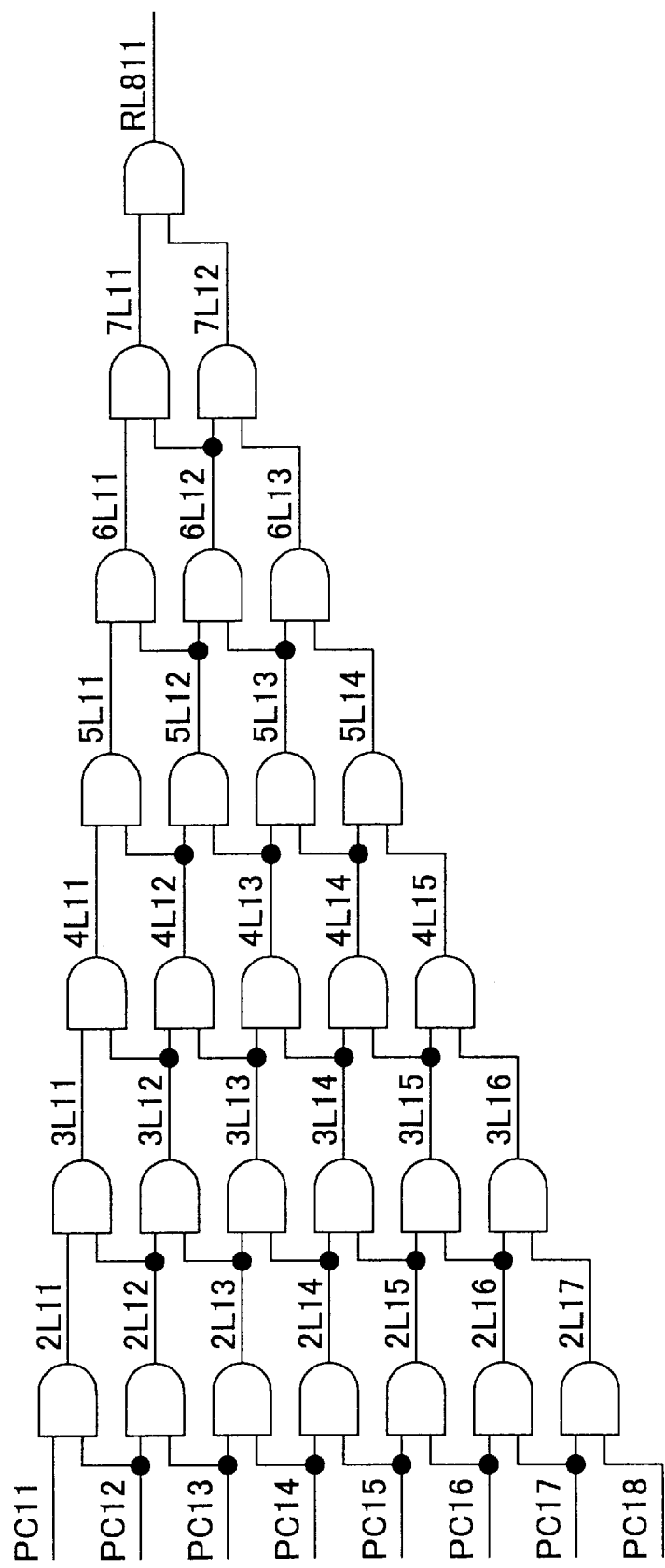
FIG. 5 is a diagram of an internal circuit of the run-length judgment preprocessing part.
Figure 9:
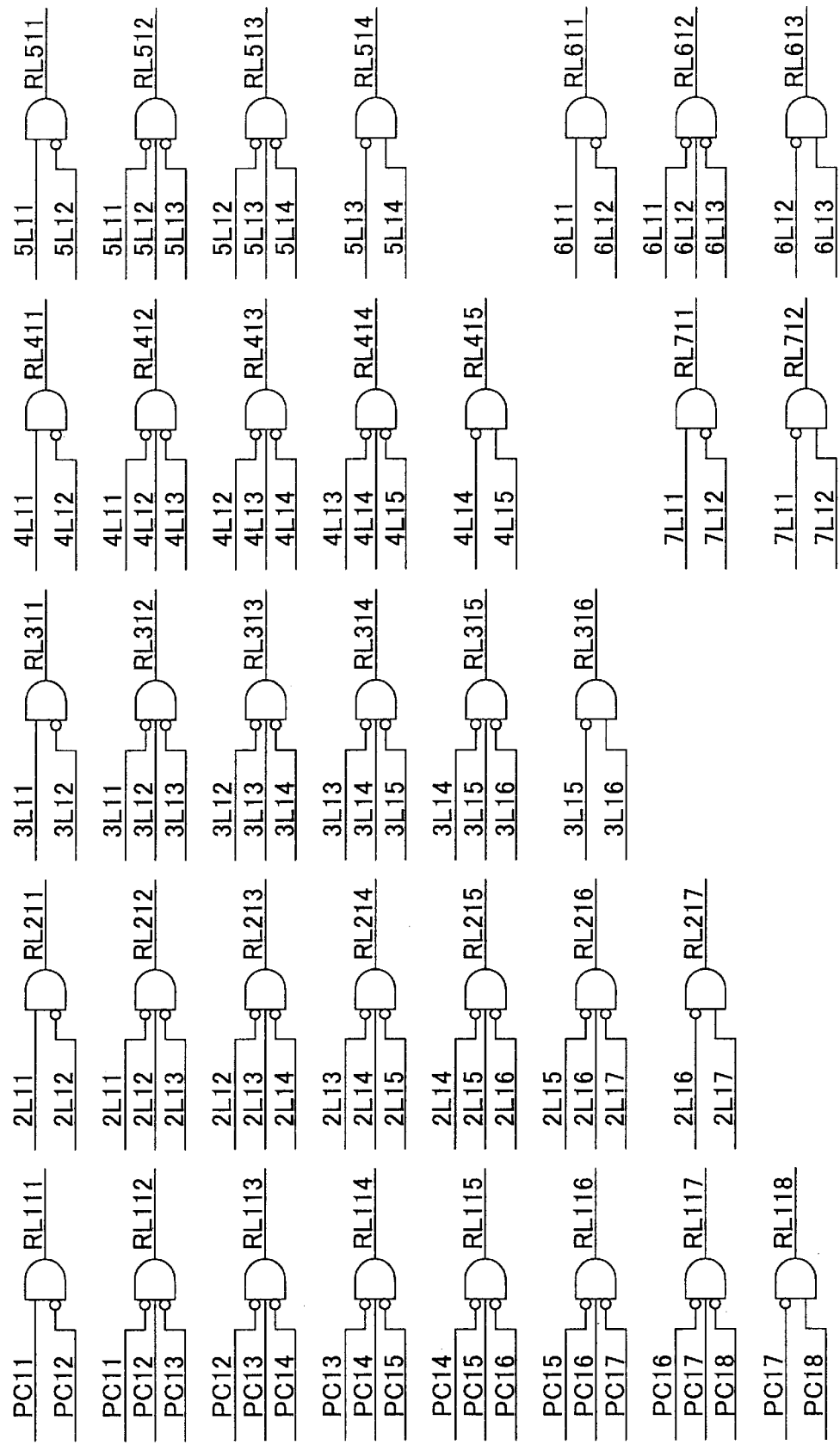
FIG. 9 is a diagram of an internal circuit of the run-length judgment circuit.

The internal circuit of the run-length judgment circuit 2202 of FIG. 9 receives the comparison results PC11–PC18 with the reference pattern of "1"s, and receives the signal 2L11 to 2L17, 3L11 to 3L16, 4L11 to 4L15, 5L11 to 5L14, 6L11 to 6L13, and 7L11 to 7L12 output from the run-length judgment preprocessing part 2201 of FIG. 5.

Figure 6:
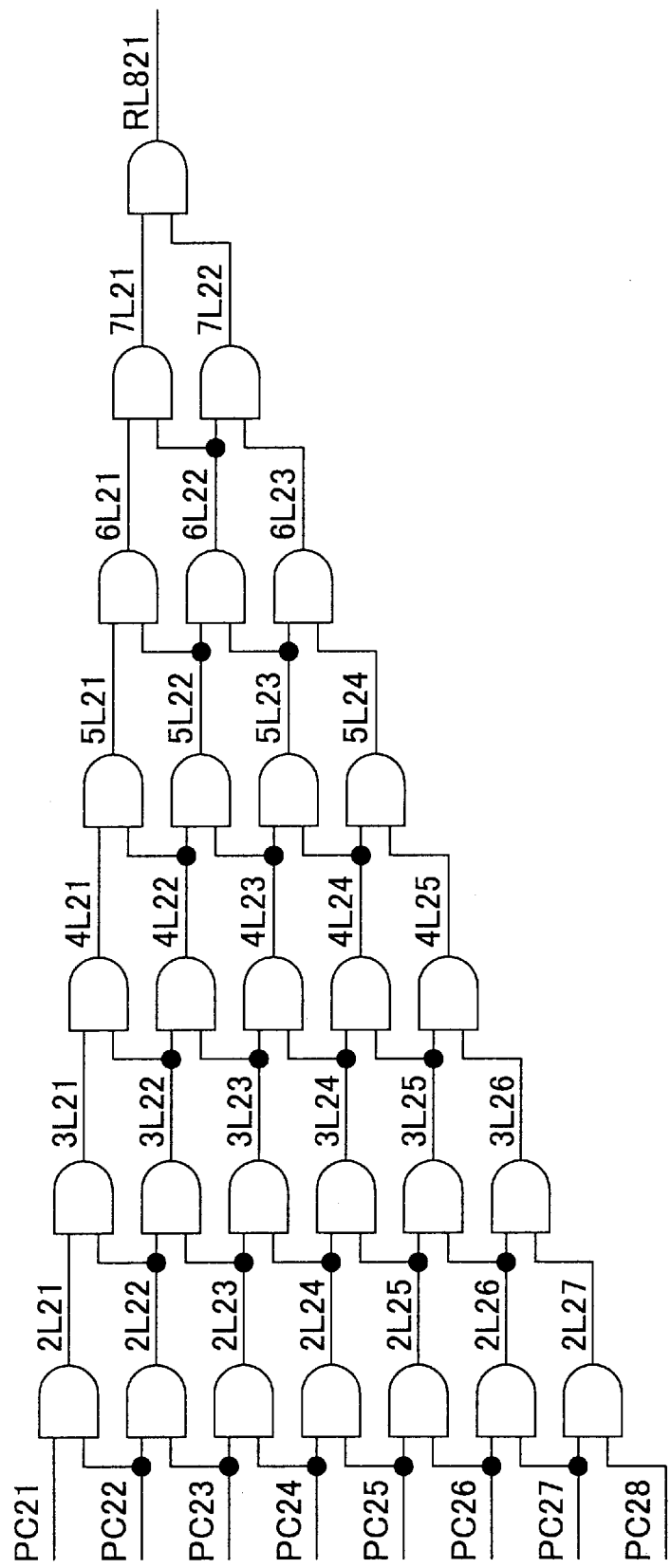
FIG. 6 is a diagram of an internal circuit of the run-length judgment preprocessing part.
Figure 10:
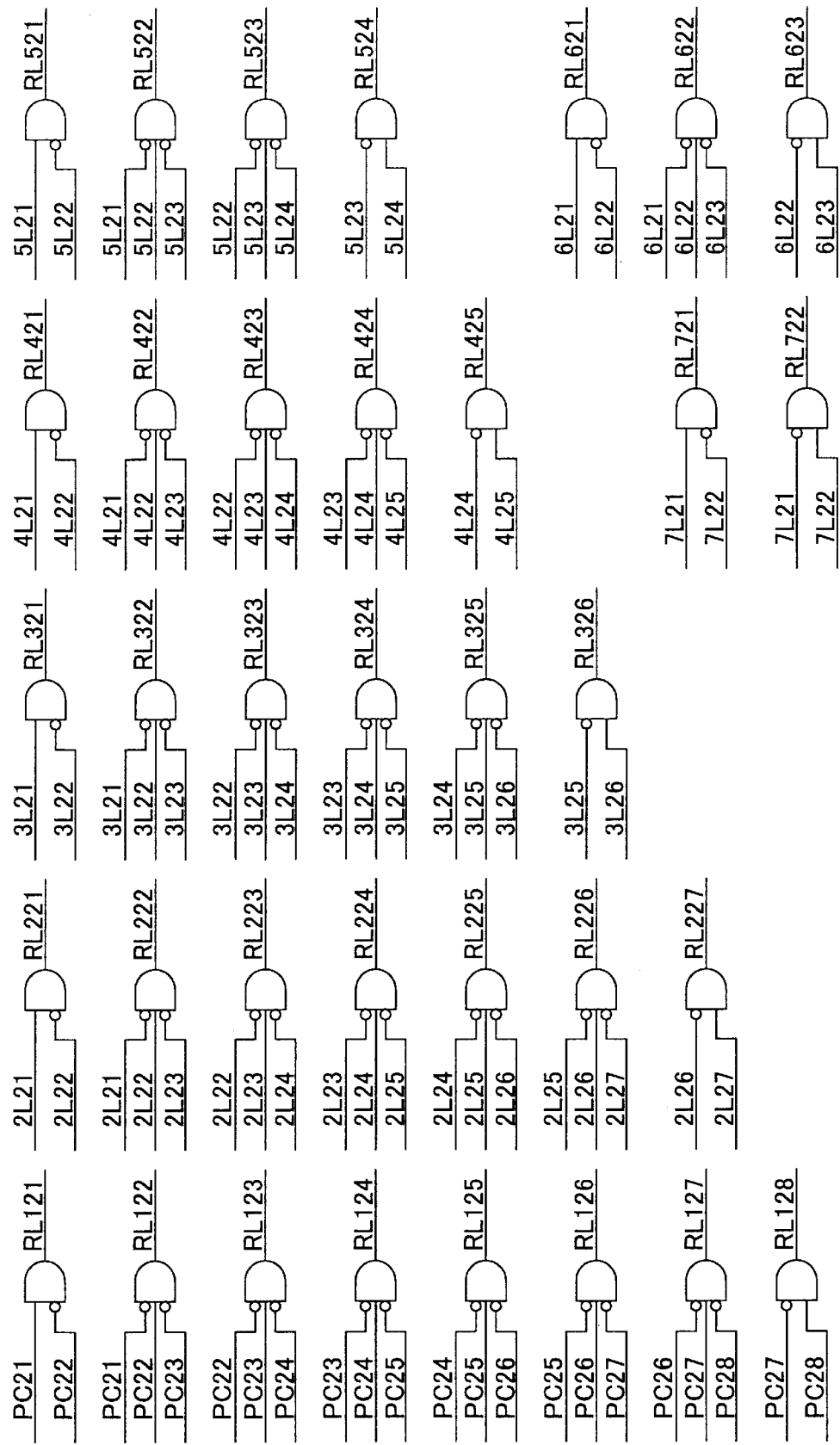
FIG. 10 is a diagram of an internal circuit of the run-length judgment circuit.

The internal circuit of the run-length judgment circuit 2202 of FIG. 10 receives the comparison results PC21–PC28 with the reference pattern with the repetition of "10"s, and receives the signals 2L21 to 2L27, 3L21 to 3L26, 4L21 to 4L25, 5L21 to 5L24, 6L21 to 6L23, and 7L21 to 7L22 output from the run-length judgment preprocessing part 2201 of FIG. 6.

Figure 7:
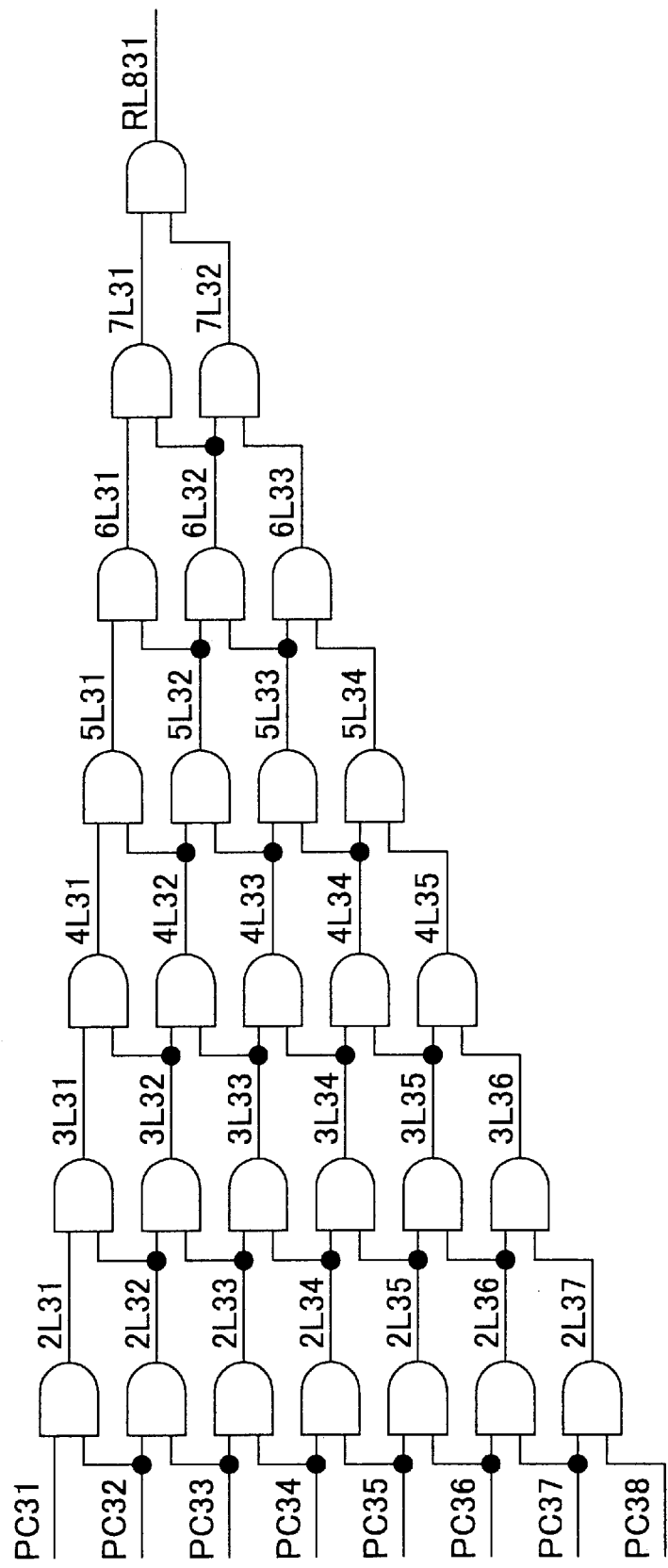
FIG. 7 is a diagram of an internal circuit of the run-length judgment preprocessing part.
Figure 11:
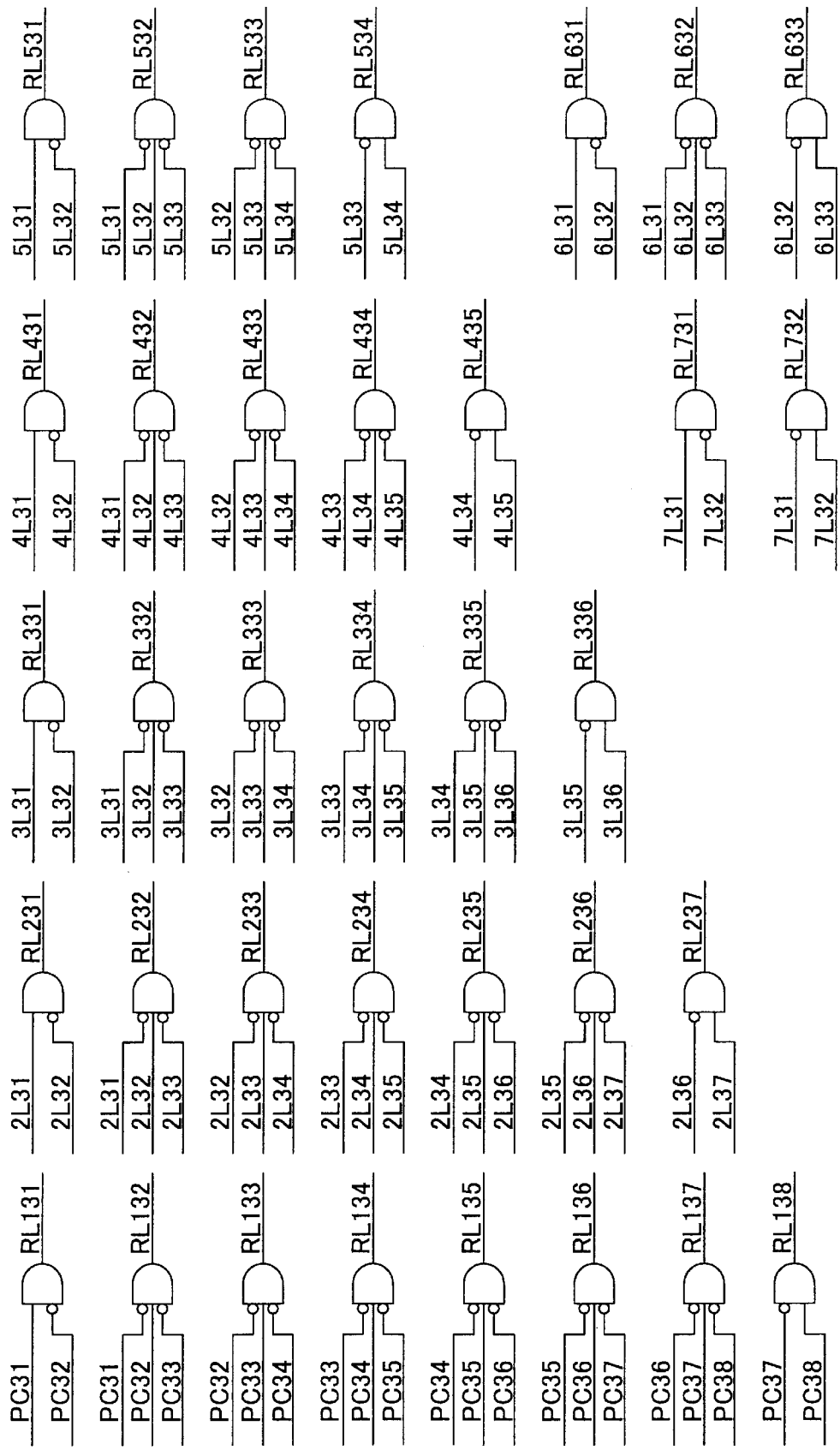
FIG. 11 is a diagram of an internal circuit of the run-length judgment circuit.

The internal circuit of the run-length judgment circuit 2202 of FIG. 11 receives the comparison results PC31–PC38 with the reference pattern with the repetition of "01"s, and receives the signals 2L31 to 2L37, 3L31 to 3L36, 4L31 to 4L35, 5L31 to 5L34, 6L31 to 6L33, and 7L31 to 7L32 output from the run-length judgment preprocessing part 2201 of FIG. 7.

The run-length judgment circuit 2202 described above determines how many times the match with respect to the same reference pattern occurs in succession, based on the received signals indicating the presence of a sequence (run) of the same data pattern. In other words, the run-length judgment circuit 2202 determines the length of the run. This determination is performed by distinguishing a portion of the received signals which becomes true independently. Fundamentally, when a sequence (run) of the same data pattern is observed and the AND gate has the three inputs: the second one (a run of the data pattern of concern) is true, and the first and third ones (the adjacent runs) are false, the length of the run (the run length) is determined.

Specifically, the run-length judgment outputs RL101–RL131, RL201–RL231, RL301–RL331, RL401–RL431, RL501–RL531, RL601–RL631 and RL701–RL731 of the internal circuits of FIG. 8–FIG. 11, and the comparison outputs RL801–RL831 of FIG. 4–FIG. 7 are used to provide the run-length judgment results of the first line portion.

The run-length judgment outputs RL102–RL132, RL202–RL232, RL302–RL332, RL402–RL432, RL502–RL532, RL602–RL632 and RL702–RL732 of the internal circuits of FIG. 8–FIG. 11 are used to provide the run-length judgment result of the second line portion.

The run-length judgment outputs RL103–RL133, RL203–RL233, RL303–RL333, RL403–RL433, RL503–RL533 and RL603–RL633 of the internal circuits of FIG. 8–FIG. 11 are used to provide the run-length judgment result of the third line portion.

The run-length judgment outputs RL104–RL134, RL204–RL234, RL304–RL334, RL404–RL434 and RL504–RL534 of the internal circuits of FIG. 8–FIG. 11 are used to provide the run-length judgment result of the fourth line portion.

The run-length judgment outputs RL105–RL135, RL205–RL235, RL305–RL335 and RL405–RL435 of the internal circuits of FIG. 8–FIG. 11 are used to provide the run-length judgment result of the fifth line portion.

The run-length judgment outputs RL106–RL136, RL206–RL236 and RL306–RL336 of the internal circuits of FIG. 8–FIG. 11 are used to provide the run-length judgment result of the sixth line portion.

The run-length judgment outputs RL108–RL138 and RL207–RL237 of the internal circuits of FIG. 8–FIG. 11 are used to provide the run-length judgment result of the seventh line portion. The run-length judgment outputs RL107–RL137 of the internal circuits of FIG. 8–FIG. 11 are used to provide the run-length judgment results of the 8th line portion.

The run-length judgment outputs which serve as truth simultaneously among the run-length judgment results of arbitrary line portions do not exist. In the present embodiment, the line portion will not be contained in the run length when only one run-length judgment output in only one kind of the arbitrary line portions becomes true, or when all become false but the run length will be determined. For example, when all the pattern comparator outputs PC01, PC11, PC21 and PC31 of LD1 are false, such image data is stored in the video memory 2211 (FIG. 3) as the bitmap data.

Accordingly, the run-length judgment output is supplied to the code determination circuit 2204 and the determination circuit 2205 where the run-length is connected to the judgment circuit 2202 as shown in FIG. 3.

In the present embodiment, the BM judgment circuit (BM JUDGE) 2203 of FIG. 3 is provided in the image display apparatus in order to detect a bitmap data. Here, the BM judgment circuit 2203 will be explained.

Figure 12:
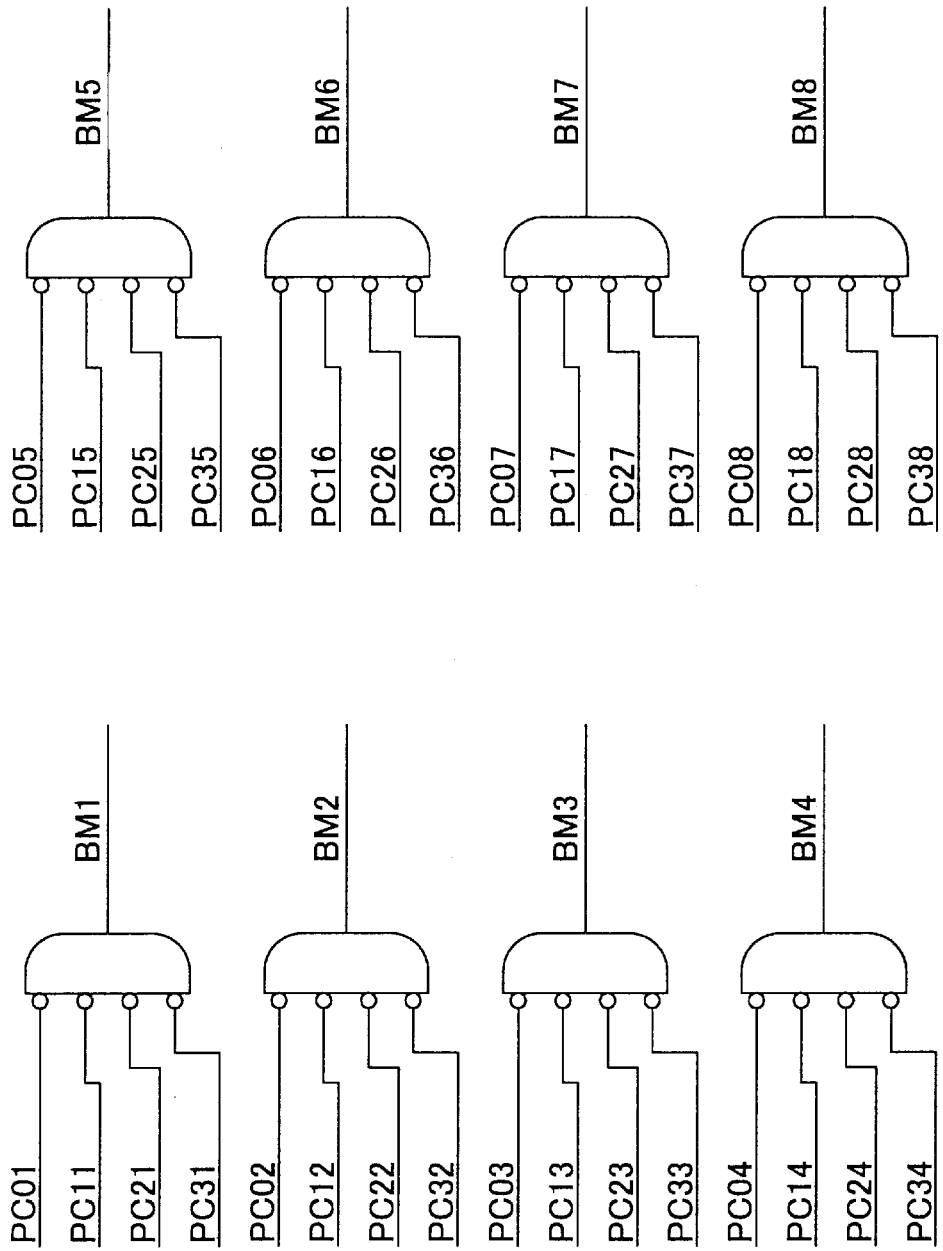
FIG. 12 is a diagram of an internal circuit of a bit-map judgment circuit in the image display apparatus of the first preferred embodiment.
Figure 13:
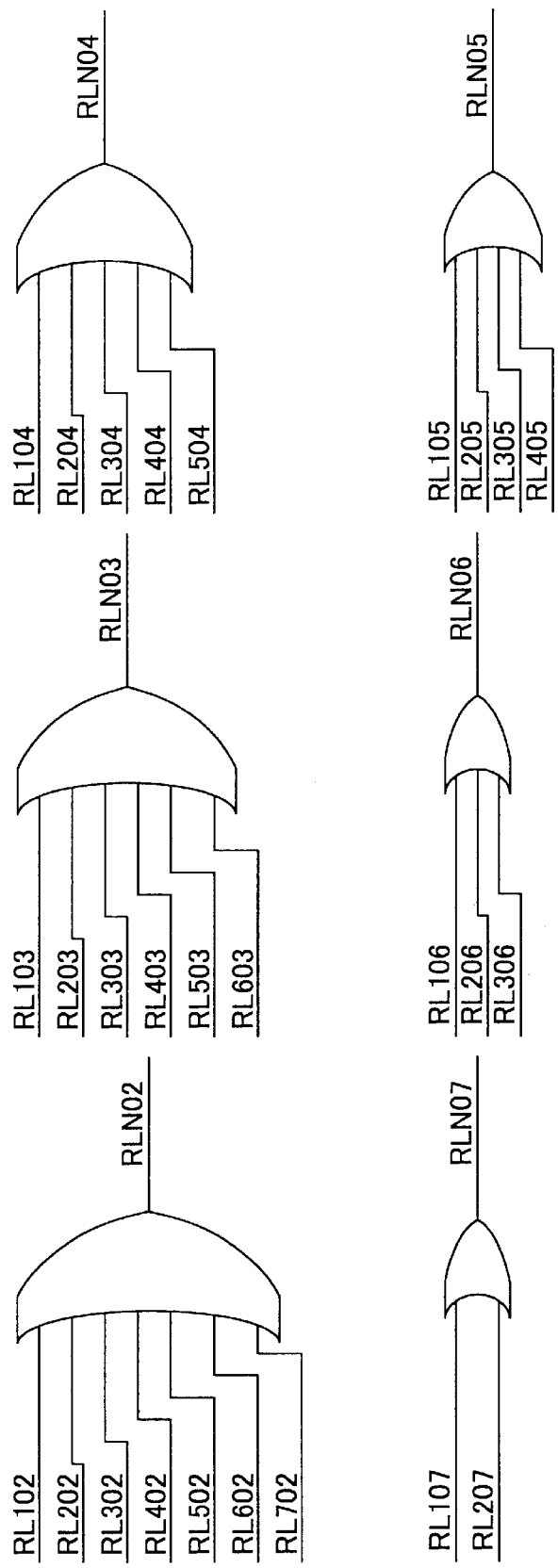
FIG. 13 is a diagram of an internal circuit of a determination circuit in the image display apparatus of the first preferred embodiment.
Figure 14:
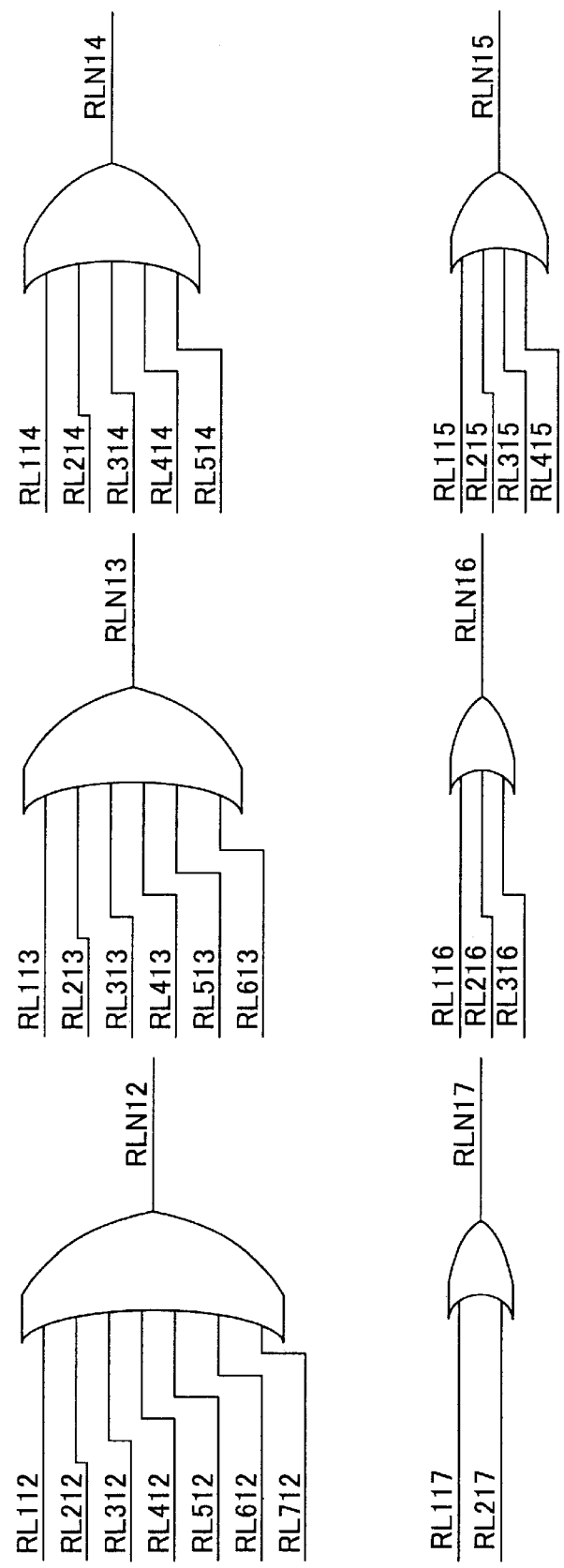
FIG. 14 is a diagram of an internal circuit of the determination circuit.
Figure 15:
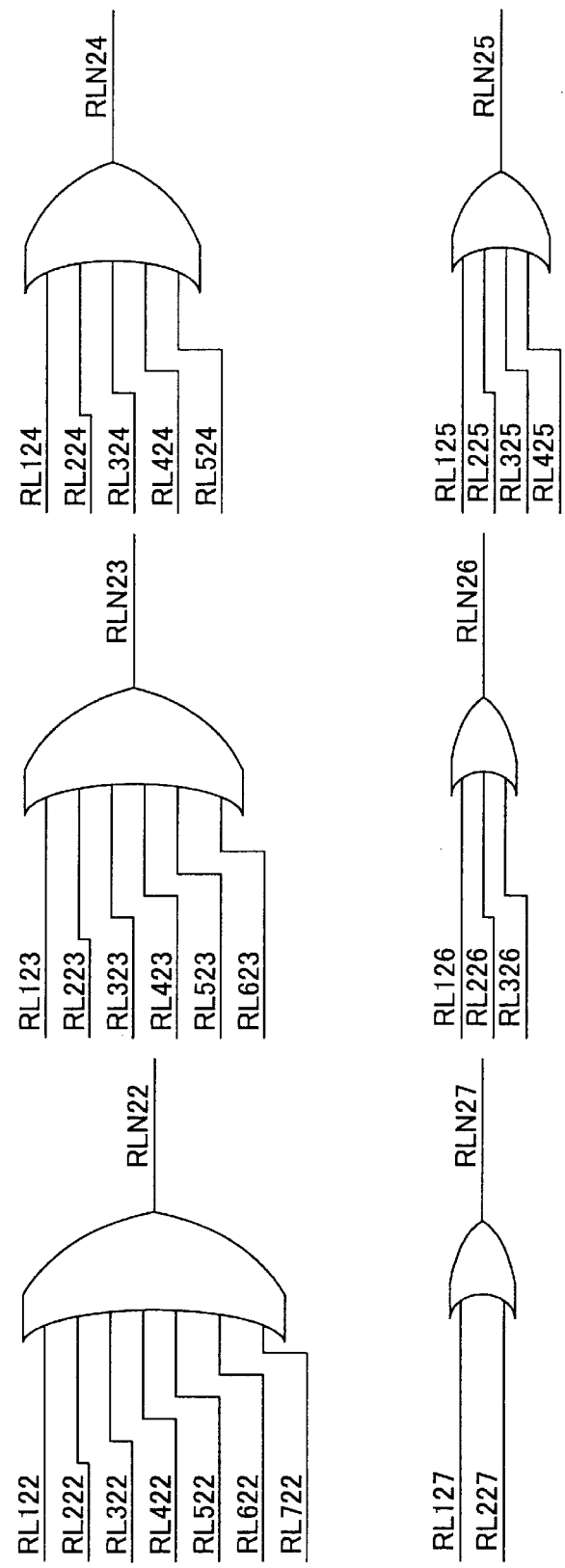
FIG. 15 is a diagram of an internal circuit of the determination circuit.
Figure 16:
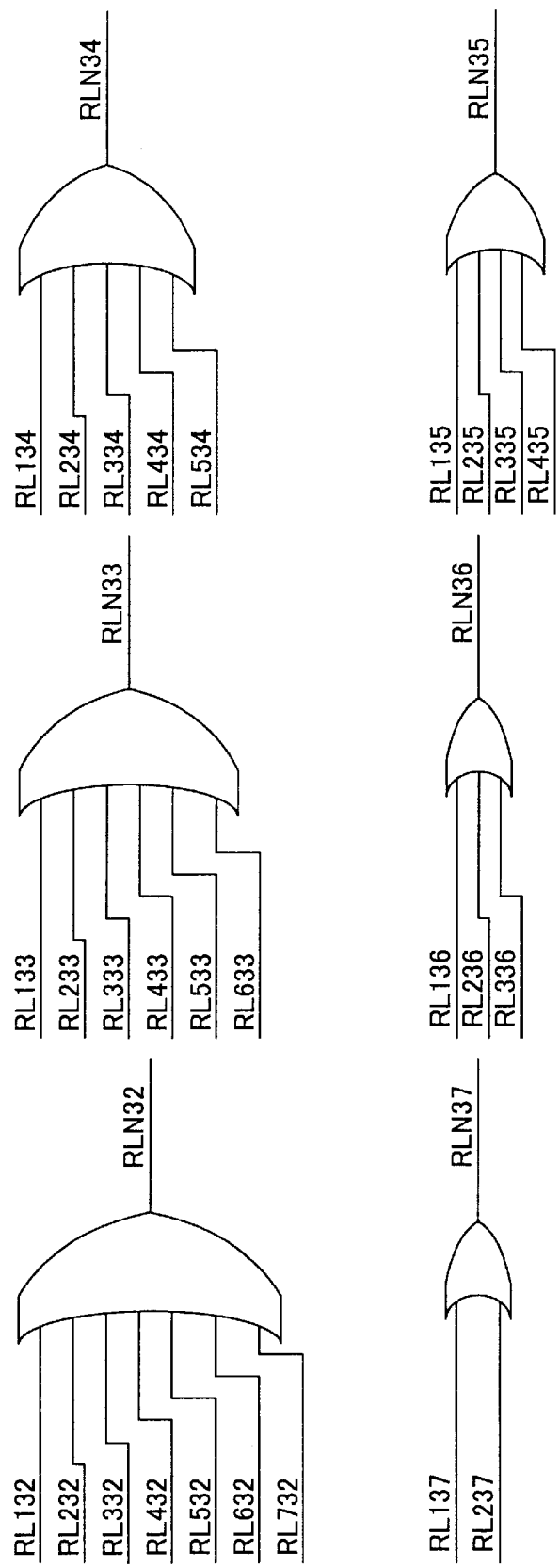
FIG. 16 is a diagram of an internal circuit of the determination circuit.

FIG. 12 shows the internal circuit of the BM judgment circuit 2203. For example, when the first line portion is a bitmap data, the output signal BM1 is set to a signal indicating the value 1 (truth). The output signals BM1–BM8 correspond to the respective line portions of the run-length judgment result. For example, when BM1 is truth, it means that all the run-length judgment results of the first line portion are false. When BM1 is false, it means that any one of the run-length judgment results of the first line portion is true.

Therefore, when BM1 is truth, the line portion image data of LD1 (FIG. 1) is stored in the video memory 2211 as bitmap data.

When the image data LDj corresponding to an arbitrary line portion j is contained in the run-length judgment result of the line portion of a higher rank, all the run-length judgment results of the j line portion and BMj are set to a signal indicating the value 0 (false), and there is no code corresponding to the j line portion, and a blank exists in the j line portion. When the encoded image data is stored in the video memory 2211, except for this blank, it is necessary that this blank line portion is excluded and a bitmap code and a run-length code are extracted before the storage.

As a specific length of the coded result is not determined in advance, it will be necessary that, at each stage of the coding, a blank line portion is excluded and a bitmap code and a run-length code are extracted. The signal which shows the distribution of the blank line portion is supplied to the code determination circuit (CODE DETERMINE) 2204 of FIG. 3.

FIG. 13 through FIG. 17 show the circuit composition of the determination circuit (DETERMINE) 2205 in the first preferred embodiment.

First, the output of the run-length judgment circuit 2202 of FIG. 3 is supplied to the determination circuit 2205 connected. That is, the output of the run-length judgment circuit 2202 is connected to each of the internal circuits of FIG. 13 through FIG. 16.

Figure 17:
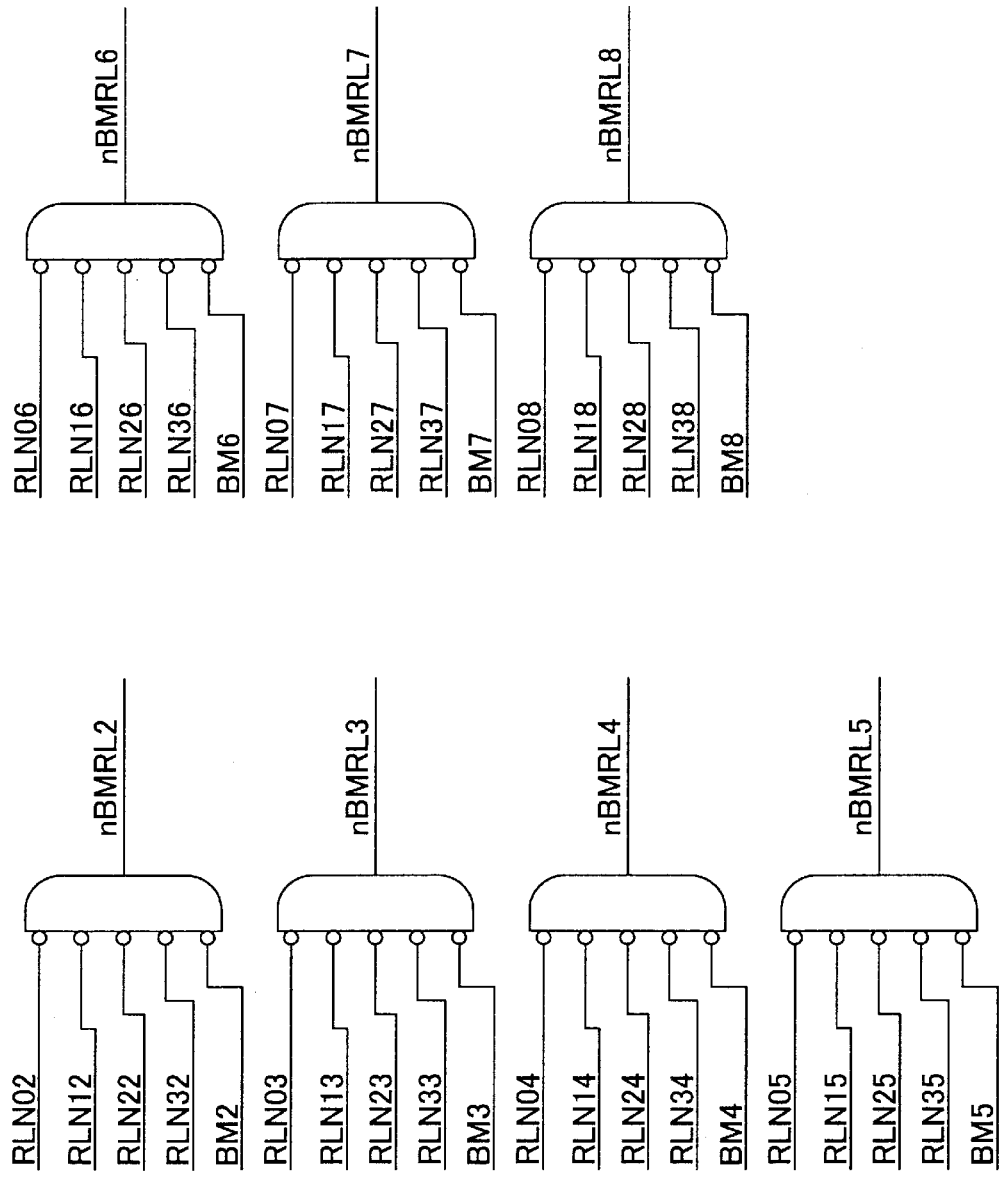
FIG. 17 is a diagram of an internal circuit of the determination circuit.

The output from each of the circuits of FIG. 13–FIG. 16 serves as truth when a run-length code exists in each line portion, and it is supplied to each of the circuits of FIG. 17 which the respective circuits of FIG. 13–FIG. 16 are connected to.

Moreover, as shown in FIG. 3, the outputs BM1–BM8 of the BM judgment circuit 2203 are also supplied to the respective circuits of FIG. 17.

When a run-length code does not exist in each line portion and the image data of the line portion is not a bit map data, each of the output signals nBMRL2–nBMRL8 of FIG. 17 is set to a signal indicating the value 1 (truth). Namely, it means that the line portion contained in the run-length code of a higher rank and is provided as a blank line portion.

When nBMRL2–nBMRL8 are false, it means that a run-length code or bitmap data exists in the line portion.

Figure 18:
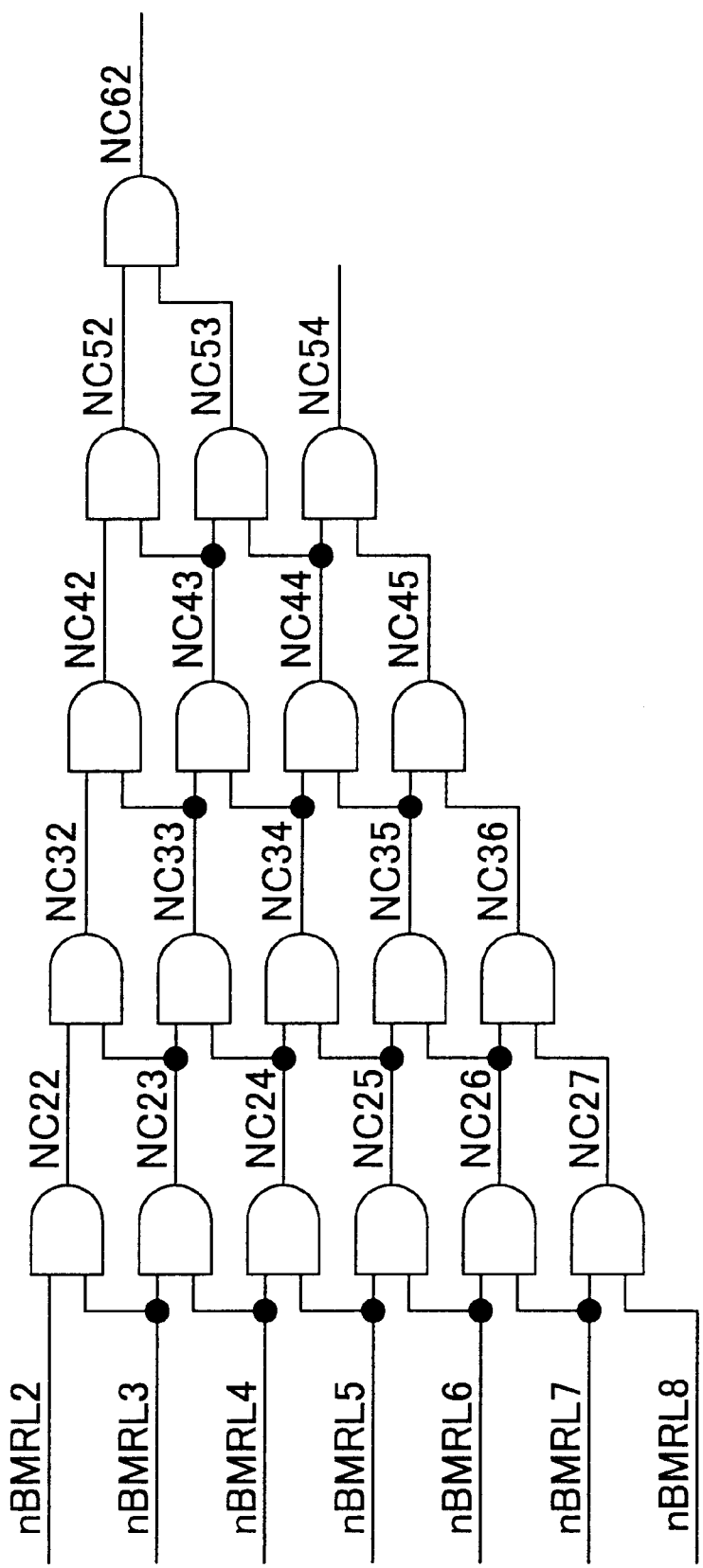
FIG. 18 is a diagram of an internal circuit of a blank run-length judgment preprocessing part in the image display apparatus of the first preferred embodiment.

Next, the output signals nBMRL2–nBMRL8 of FIG. 17 are supplied to the blank run-length judgment preprocessing part (BRL JUDGE P/P) 2206 of FIG. 3. FIG. 18 shows an internal circuit of the blank run-length judgment preprocessing part 2206 in the first preferred embodiment, which is provided as the convergence chain type OR circuit.

Figure 19:
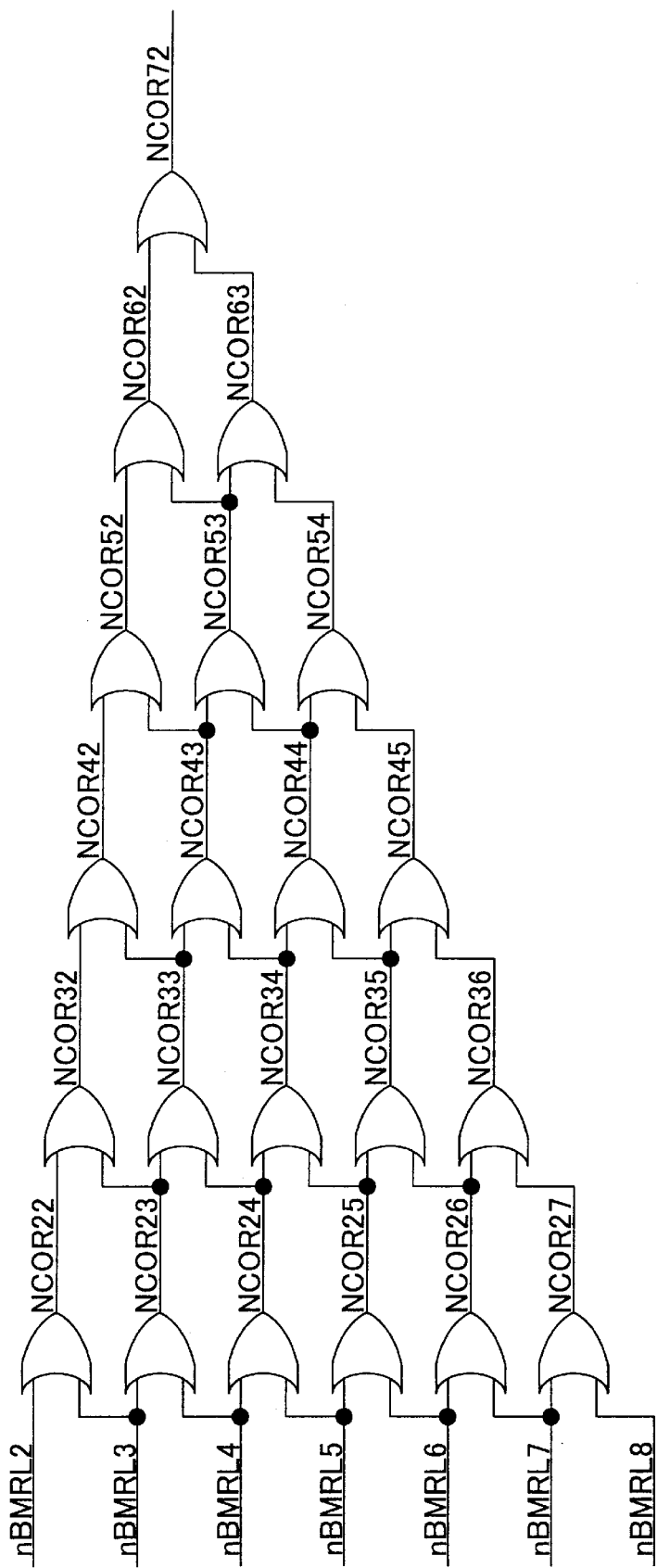
FIG. 19 is a diagram of an internal circuit of the blank run-length judgment preprocessing part.

Moreover, FIG. 19 shows the internal circuit of the blank run-length judgment preprocessing part 2206 which is provided as the convergence chain type AND circuit.

The output signal of the blank run-length judgment preprocessing part 2206 in FIG. 18 indicates that a blank sequence (run) exists similar to the run-length judgment preprocessing part 2201. The output of the blank run-length judgment preprocessing part 2206 (which is the convergence chain type OR circuit) is supplied to the blank run-length judgment circuit (BRL JUDGE) 2207 of FIG. 3 connected thereto.

In the circuit composition of FIG. 19, the output signal NCOR22 indicates whether a blank exists in the second and third line portions. The output signal NCOR32 indicates whether a blank exists in the second to fourth line portions. Similarly, the output signal NCOR42 indicates whether a blank exists in the second to fifth line portions. The output signal NCOR 52 indicates whether a blank exists in the second to sixth line portions. The output signal NCOR62 indicates whether a blank exists in the second to seventh line portions. The output signal NCOR72 indicates whether a blank exists in the second to eighth line portions.

The output of the blank run-length judgment preprocessing part 2206 (the convergence chain type AND circuit) is supplied to the code determination circuit 2204 of FIG. 3 connected to thereto.

Figure 20:
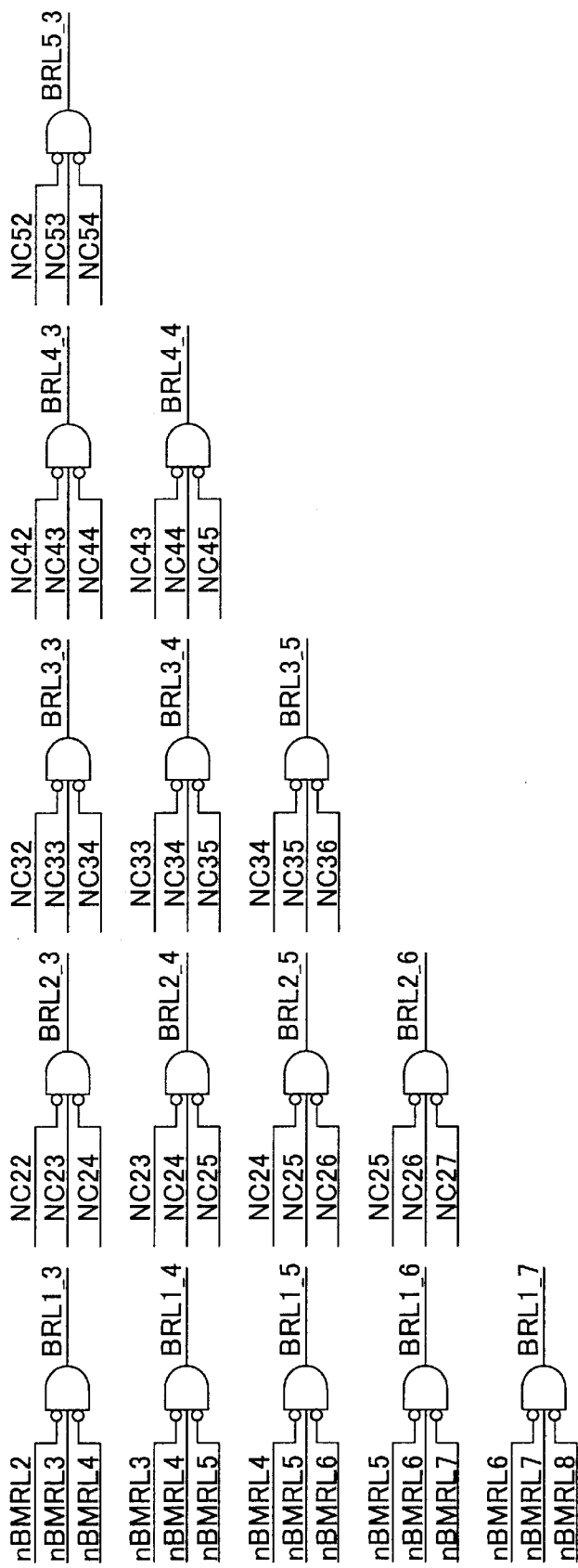
FIG. 20 is a diagram of an internal circuit of a blank run-length judgment circuit in the image display apparatus of the first preferred embodiment.

FIG. 20 shows the internal circuit of the blank run-length judgment circuit 2207 in the first preferred embodiment. The blank run-length judgment circuit 2207 in FIG. 20 determines how many times a blank continues from among the received signals indicating the presence of a run of blanks, similar to the run-length judgment circuit 2202.

Next, the output of the determination circuit 2205, the output of the blank run-length judgment preprocessing part 2206, and the output of the blank run-length judgment circuit 2207 are supplied to the blank number determination circuit (BN DETERMINE) 2208 of FIG. 3, and the processing needed to determine the arrangement of final codes is performed.

Figure 21:
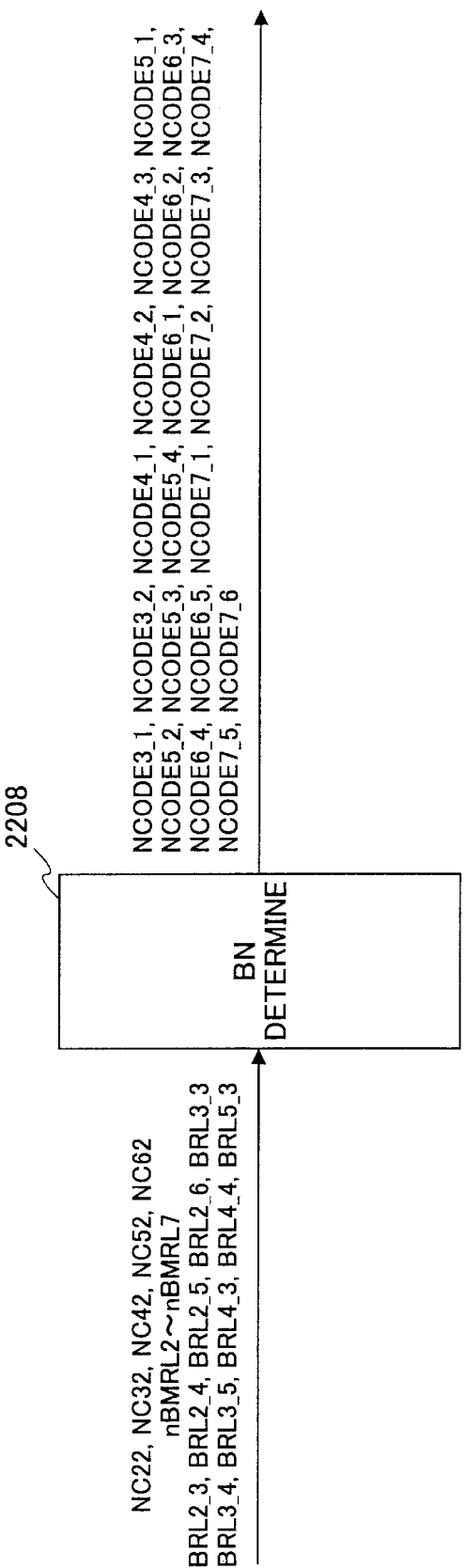
FIG. 21 is a diagram for explaining a structure of a blank number determination circuit in the image display apparatus of the first preferred embodiment.

FIG. 21 shows the structure of the blank number determination circuit 2208 in the first preferred embodiment. Moreover, FIG. 22 through FIG. 26 show the functions of the internal circuits of the blank number determination circuit 2208.

The internal circuits of FIG. 22–FIG. 26 output the signals NCODE 3_1-NCODE 7_6 which respectively determine how many line portions of blank continue in the line portions from the second line portion to the related line portion (which is called the blank number), based on the incoming signals supplied to the blank number determination circuit 2208 of FIG. 21.

Figure 22:
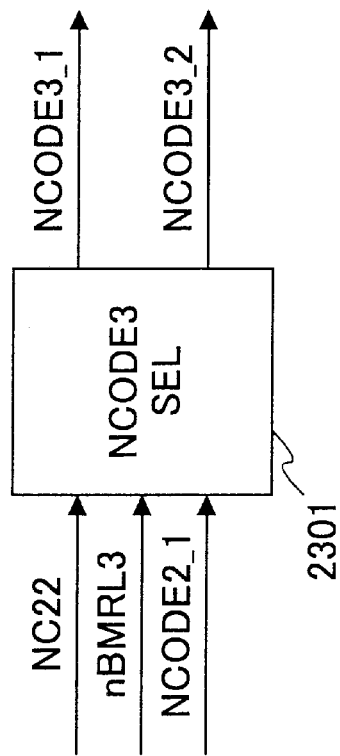
FIG. 22 is a diagram for explaining a function of an internal circuit NCODE3 SEL of the blank number determination circuit.
Figure 23:
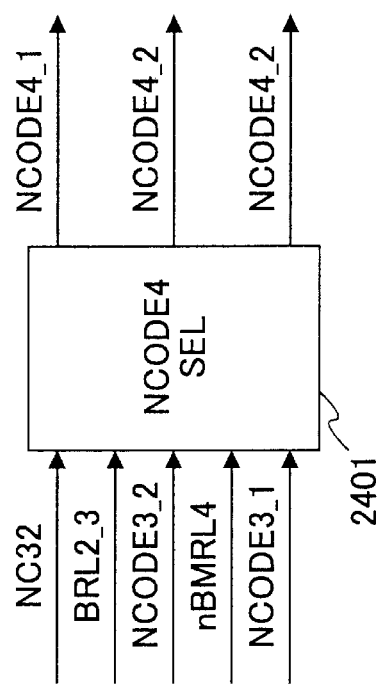
FIG. 23 is a diagram for explaining a function of an internal circuit NCODE4 SEL of the blank number determination circuit.
Figure 24:
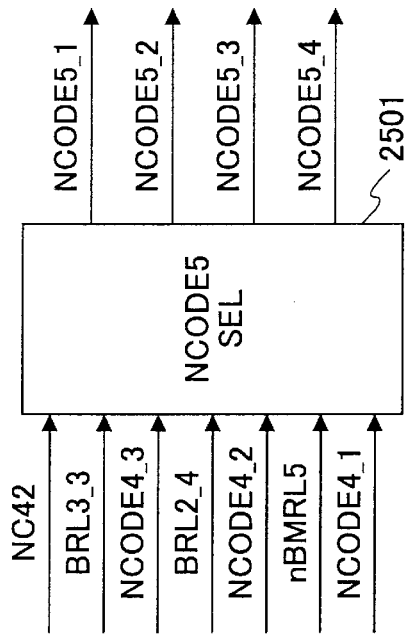
FIG. 24 is a diagram for explaining a function of an internal circuit NCODE5 SEL of the blank number determination circuit.
Figure 25:
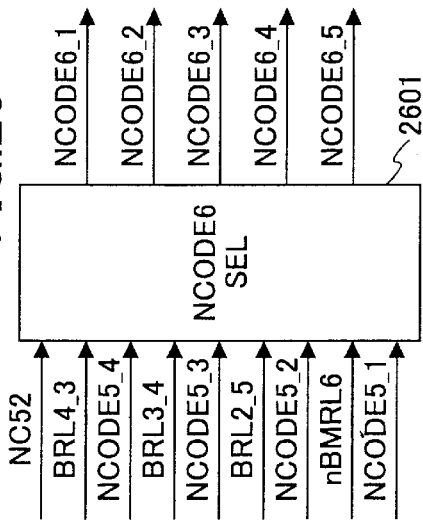
FIG. 25 is a diagram for explaining a function of an internal circuit NCODE6 SEL of the blank number determination circuit.
Figure 26:
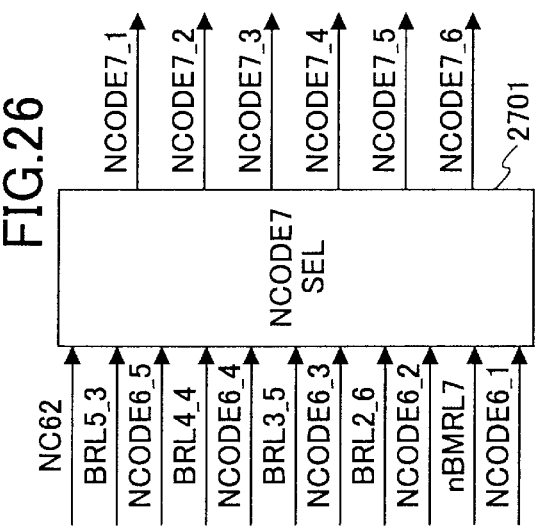
FIG. 26 is a diagram for explaining a function of an internal circuit NCODE7 SEL of the blank number determination circuit.

Specifically, FIG. 22 shows the composition of the internal circuit NCODE3 SEL 2301 to detect the blank number related to the second and third line portions, and the truth table of each signal. FIG. 23 shows the composition of the internal circuit NCODE4 SEL 2401 to detect the blank number related to the second to fourth line portions, and the truth table of each signal. FIG. 24 shows the composition of the internal circuit NCODE5 SEL 2501 to detect the blank number related to the second to fifth line portions, and the truth table of each signal. FIG. 25 shows the composition of the internal circuit NCODE6 SEL 2601 to detect the blank number related to the second to sixth line portions, and the truth table of each signal. FIG. 26 shows the composition of the internal circuit NCODE7 SEL 2701 to detect the blank number related to the second to seventh line portions, and the truth table of each signal.

The blank number determination circuit 2208, having the internal circuits shown in FIG. 22–FIG. 26, outputs the signals NCODE 3_1-NCODE 7_6 which respectively determine how many line portions of blank continue in the line portions from the second line portion to the related line portion (the blank number).

For example, the output signal NCODE 3_1 indicates that the blank of only one line portion exists in the second and third line portions, and the output signal NCODE 7_6 indicates that the blank of six line portions exists in the second to seventh line portions.

Next, the respective outputs of the line buffer 2209, the BM judgment circuit 2203, the run-length judgment circuit 2202, the determination circuit 2205, the blank run-length judgment preprocessing part 2206, and the blank number determination circuit 2208 are supplied to the code determination circuit 2204 of FIG. 3.

Furthermore, a predetermined pattern data of the code register 2210 is supplied to the code determination circuit 2204 so that a reference code representing a predetermined run length or a reference code indicating a predetermined separator of image data can be changed by executing software processing with the pattern data of the code register 2210. The final encoded data CODE1–CODE8 are thus obtained at the output of the code determination circuit 2204. The code register 2210 is provided for the use that is aimed at secret maintenance of storing data.

Figure 27:
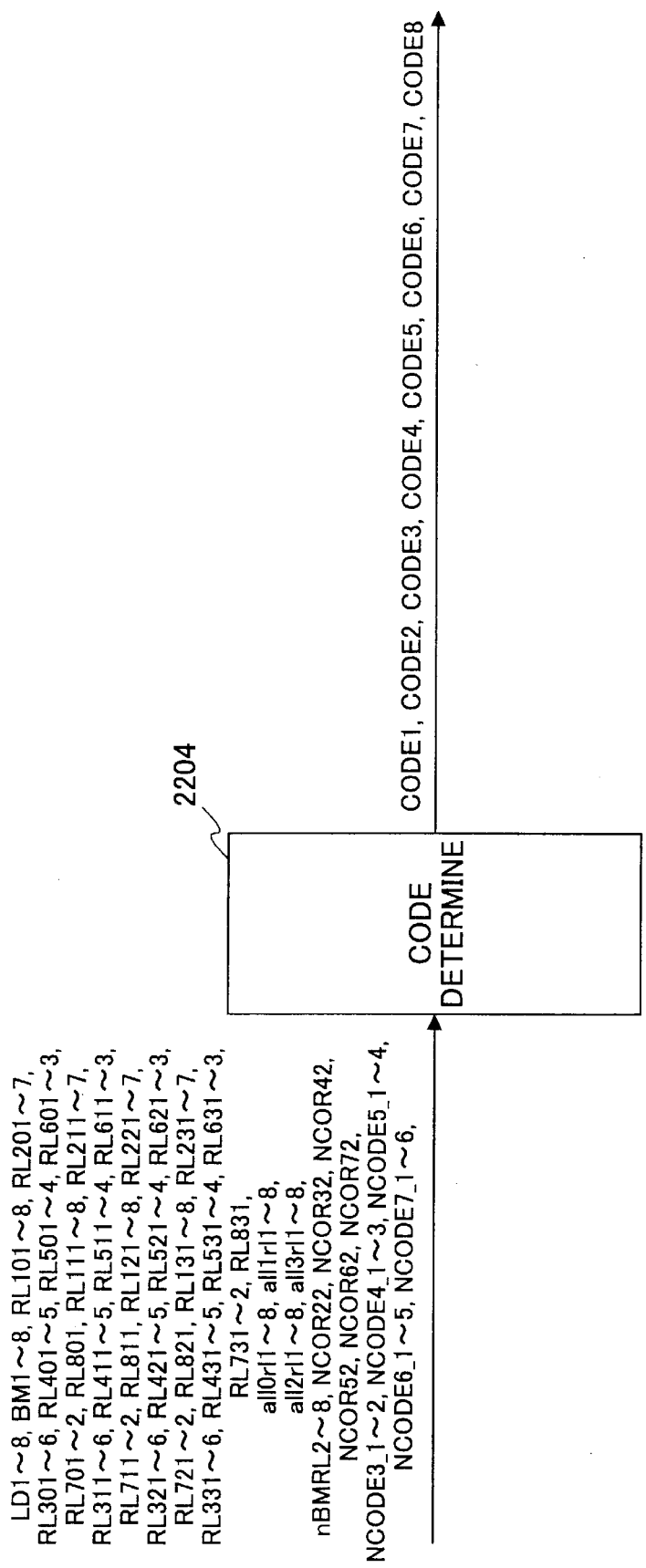
FIG. 27 is a diagram for explaining a structure of a code determination circuit in the image display apparatus of the first preferred embodiment.
Figure 28:
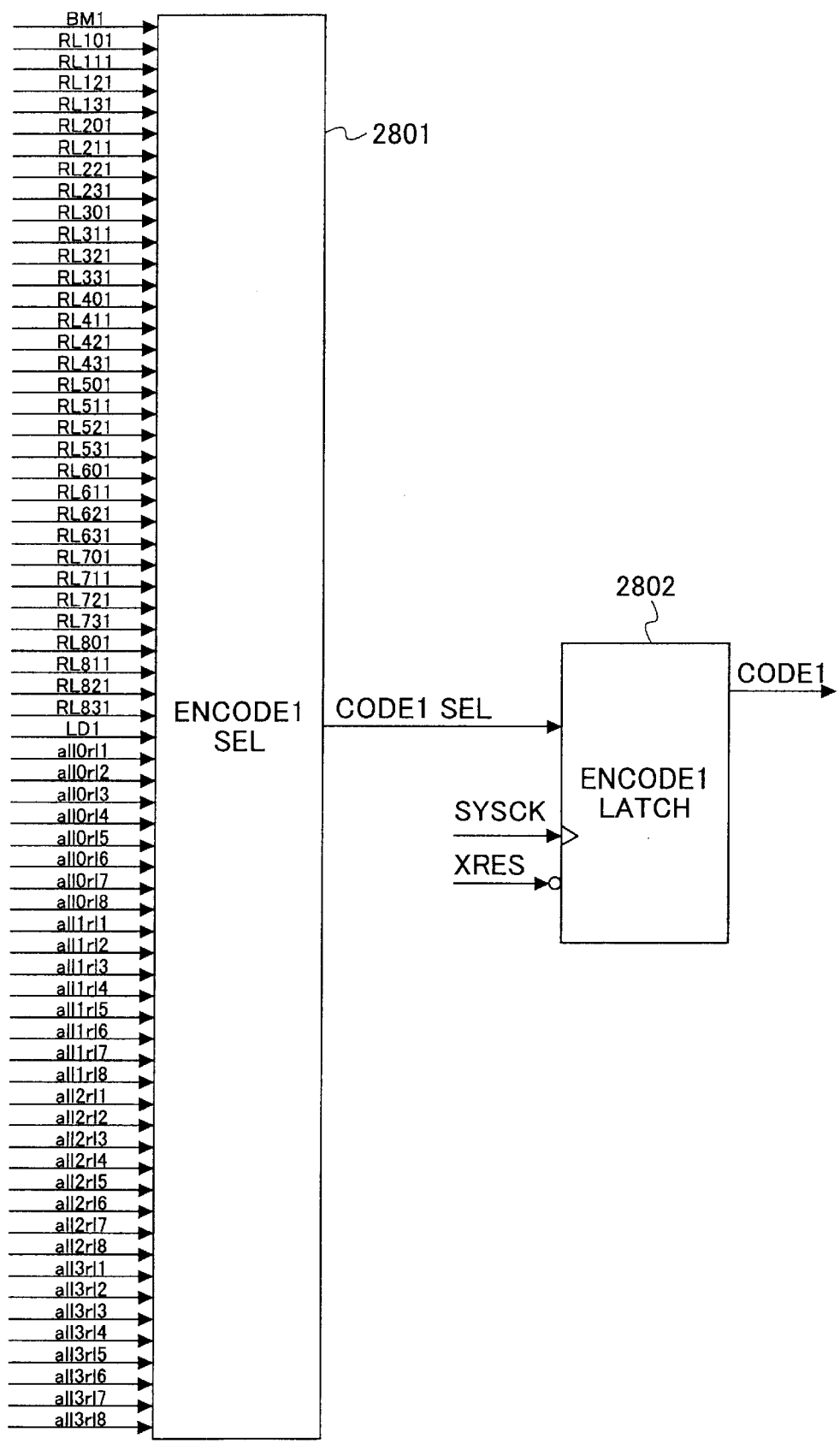
FIG. 28 is a diagram of internal circuits ENCODE1 SEL and ENCODE1 LATCH of the code determination circuit.
Figure 29:
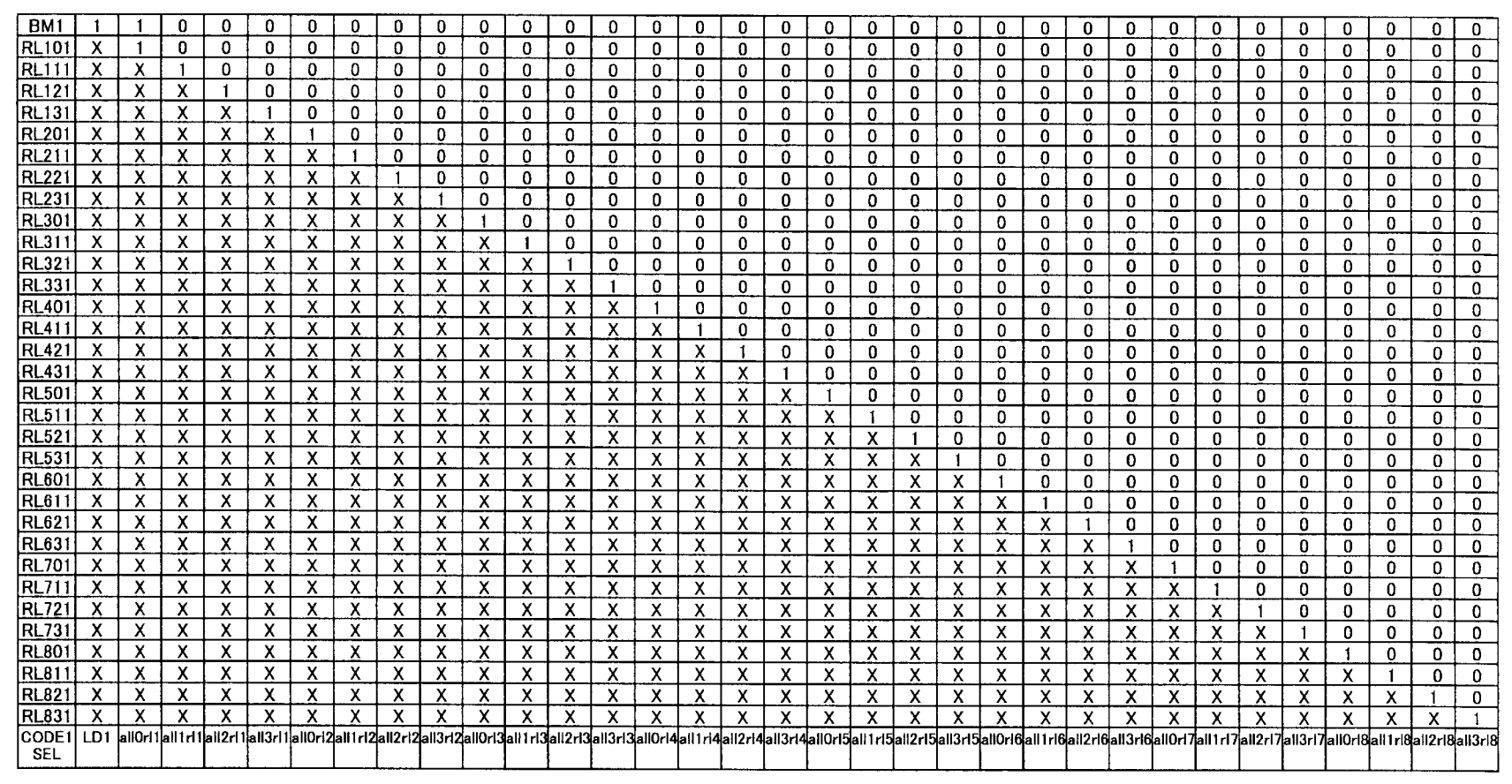

FIG. 27 shows the structure of the code determination circuit 2204 in the first preferred embodiment. FIG. 28 shows the internal circuit ENCODE1 SEL 2801 and the internal circuit ENCODE1 LATCH 2802 of the code determination circuit 2204. FIG. 29 shows the function of the internal circuit ENCODE1 SEL of FIG. 28 which determines CODE1.

Figure 30:
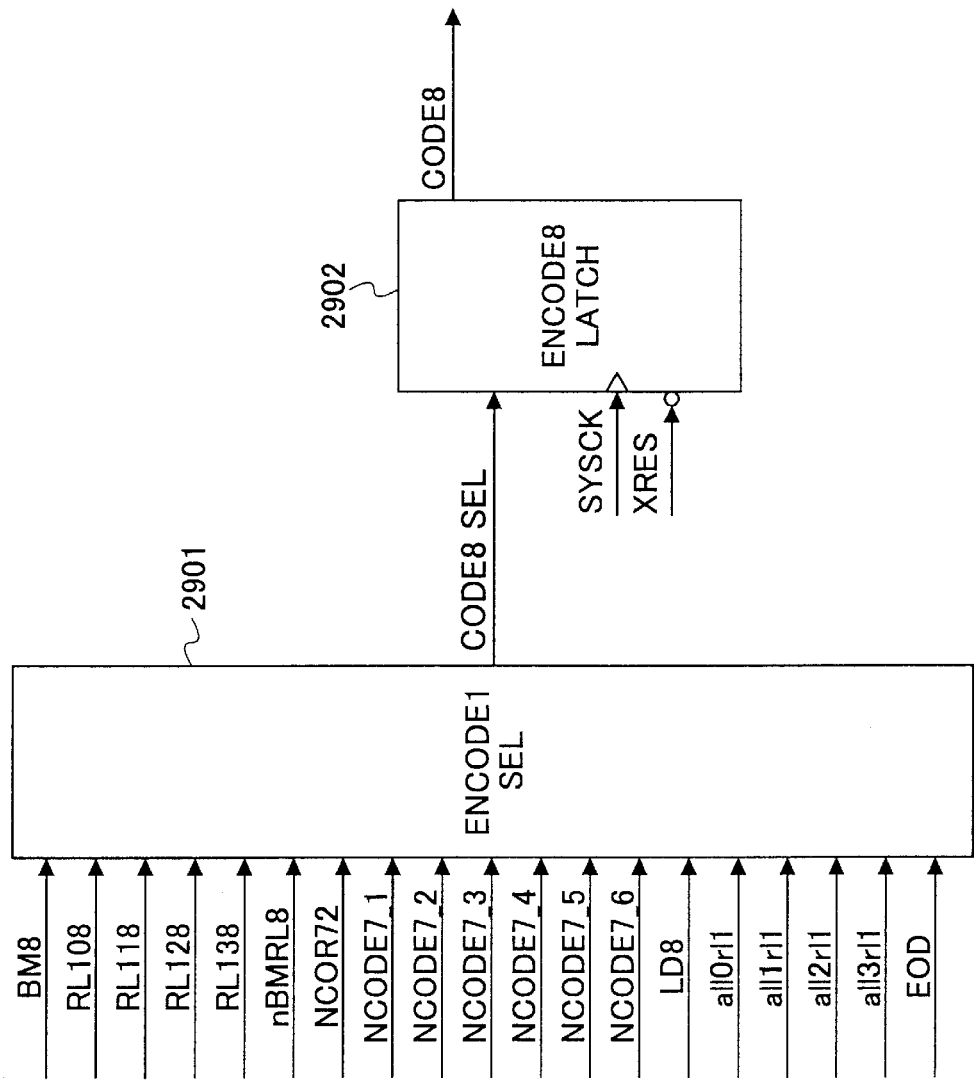
FIG. 30 is a diagram of internal circuits ENCODE8 SEL and ENCODE8 LATCH of the code determination circuit.

FIG. 30 shows the internal circuit ENCODE8 SEL 2901 and an internal circuit ENCODE8 LATCH 2902 of the code determination circuit 2204. FIG. 31 shows the function of the internal circuit ENCODE8 SEL of FIG. 30 which determines CODE8.

Figure 32:
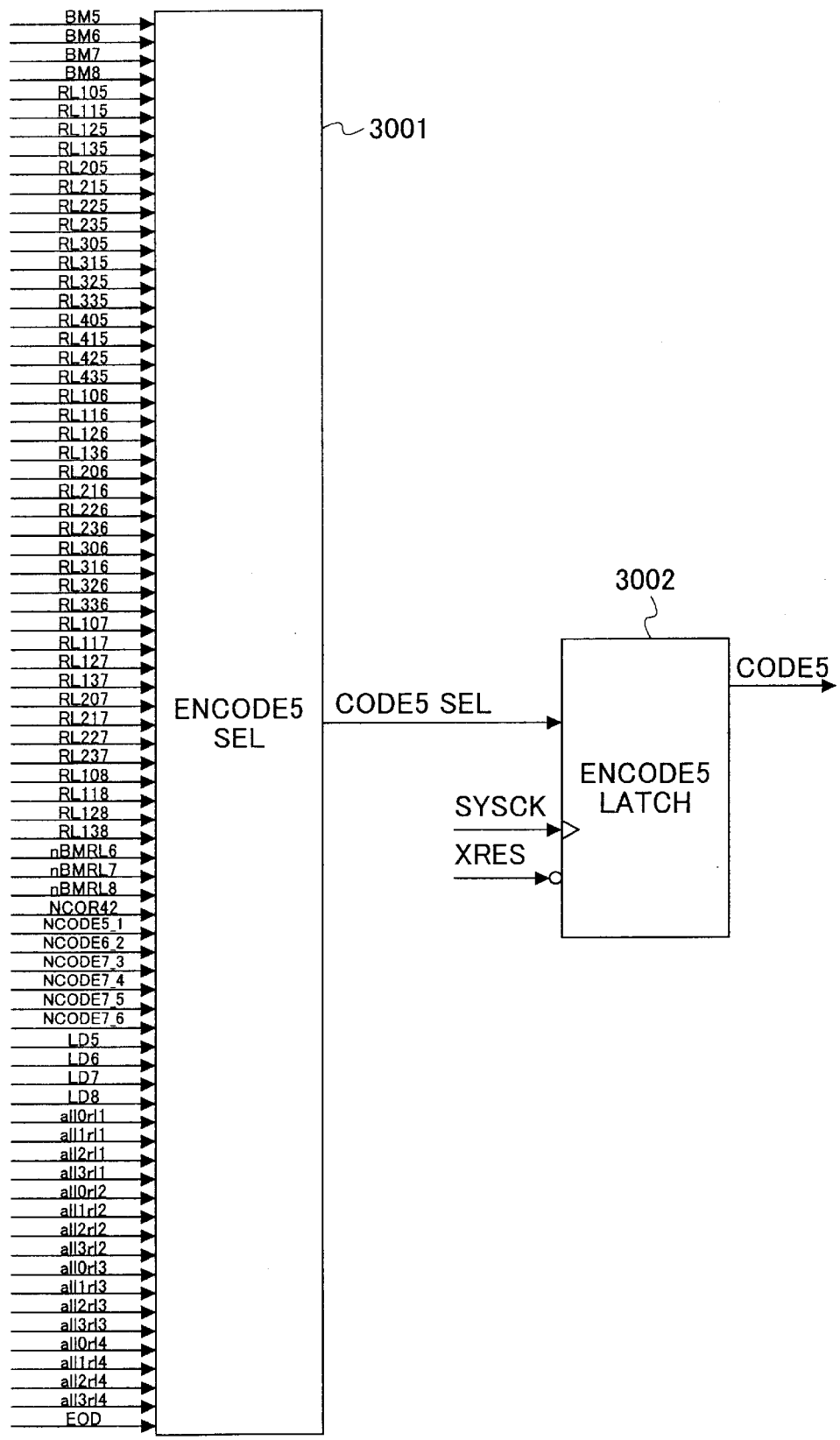
FIG. 32 is a diagram of internal circuits ENCODE5 SEL and ENCODE5 LATCH of the code determination circuit.
Figure 33:
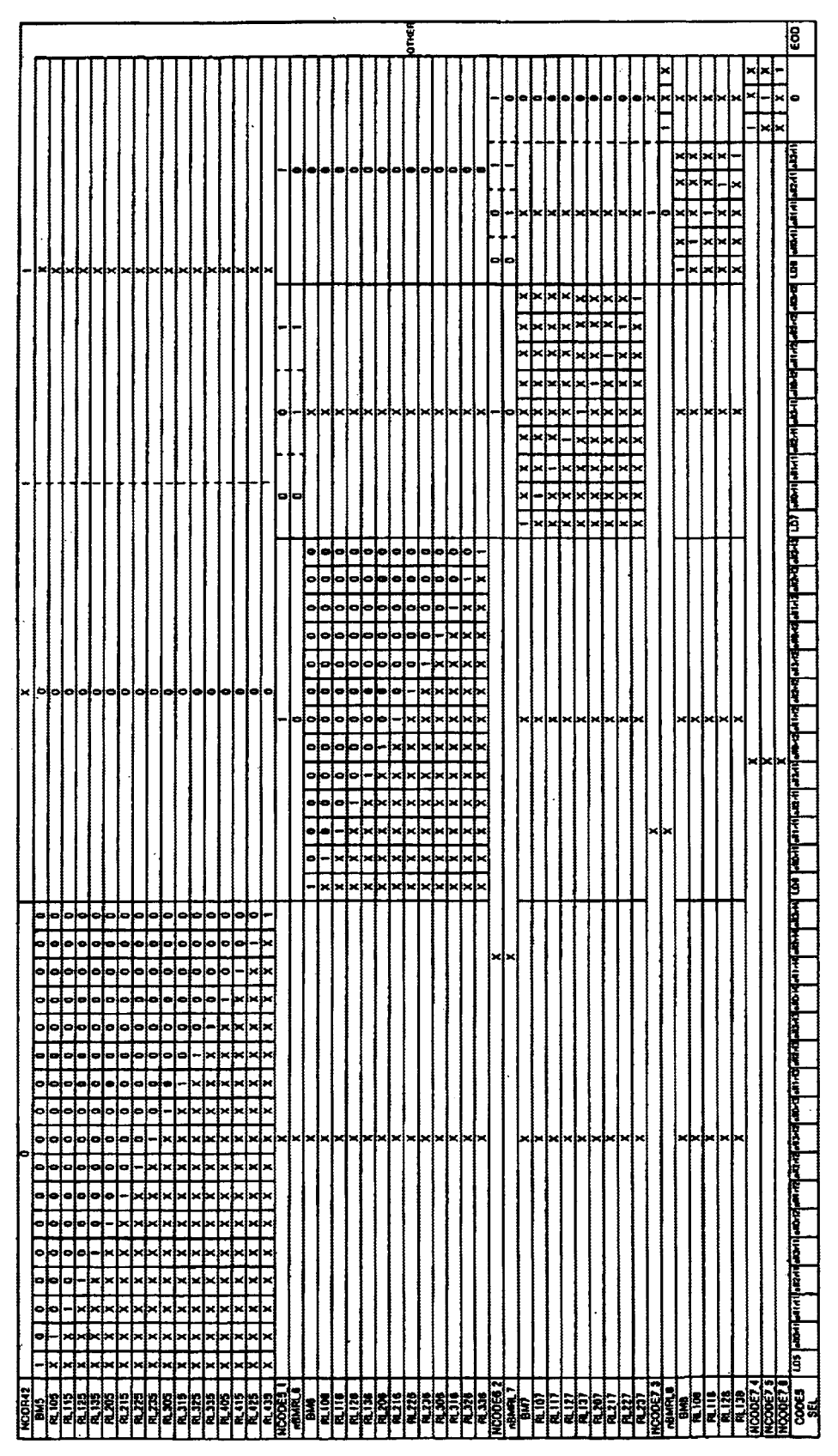

FIG. 32 shows the internal circuits ENCODE5 SEL 3001 and the internal circuit ENCODE5 LATCH 3002 of the code determination circuit 2204. FIG. 33 shows the function of the internal circuit ENCODE5 SEL of FIG. 32 which determines CODE5.

Figure 34:
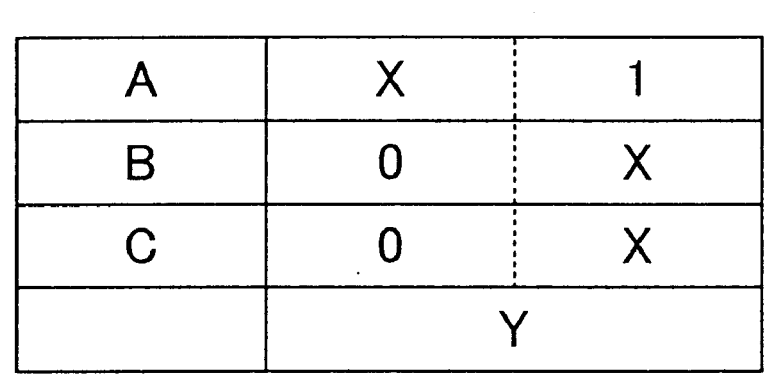

Moreover, FIG. 34 shows the function of an OR logic used in the truth tables of FIG. 31 and FIG. 33.

The output values (Y) of the two AND circuits are determined by using the formula: $Y=(!B \times !C)+A$ as shown in FIG. 34. In addition, since "x" in the truth tables of FIG. 31 and FIG. 33 indicates a "don't care" bit, the value of the bit indicated by "x" is not taken into consideration. Namely, the values (Y) become a truth signal indicating the value one when either the conditions (A=x, B=0, C=0) on the left-hand side of the vertical dotted line or the conditions (A=1, B=x, C=x) on the right-hand side of the vertical dotted line are met.

In addition, the structure of the respective internal circuits which determine CODE2–CODE4, CODE6 and CODE7 is essentially the same as the structure of FIG. 32 except that the input signals sent to the internal circuits are different, and a description thereof will be omitted.

As described above, if all the image data LD1–LD8 from the line buffer 2209 are determined, all the incoming signals to the code determination circuit 2204 can be determined by the image display apparatus of the present embodiment. Hence, the image display apparatus of the present embodiment is able to provide the final encoded data CODE1–CODE8 by the code determination circuit at one clock.

Moreover, in order to locate an end of the image data of one line stored in the video memory 2211, an EOD (end of data) code is inserted to the signal supplied to the code determination circuit 2204. In the present embodiment, it is assumed that the image data of one line (the data width treated at a time) is 8 bytes which is a fixed length, and it is possible to locate the end of the image data of one line without inserting an EOD code. There is no need to set the width of the image data of one line to 9 bytes or more.

The present invention is not limited to the above-described embodiment which performs the pattern matching of 8-bit line portion data derived from the 64-bit line buffer, and performs the coding of each line portion data. For example, the data width that is treated at a time may be set to 128 bits, 256 bits or more, rather than 64 bits, and the minimum unit of coding may be set to 16 bits, 32 bits or more, rather than 8 bits. In such alternative embodiment, the pattern matching and the coding may be carried out in the same manner.

However, in such alternative embodiment, it is necessary to optimize the number of bits for one line and the minimum unit of coding depending on the composition of the video memory 2211, the characteristic of the edit method (the access method of the host CPU), and the display data being treated. Moreover, it is necessary to insert an EOD code in order to locate an end of the image data of one line.

Moreover, the above-described embodiment has been explained as the case where the coding/decoding method of image data is applied to the image display apparatus. However, the present invention is not limited to this embodiment, but it is applicable to the coding/decoding of image data in an image display portion of an information processing apparatus.

According to the image display apparatus of the present embodiment, it is possible to perform the encoding of image data more speedily than the conventional method, when the video memory is utilized effectively, and provide the capability of image data conversion to instantaneously perform the encoding.

Next, a description will be given of a second preferred embodiment of the present invention with reference to FIG. 35 and FIG. 36.

Figure 35:
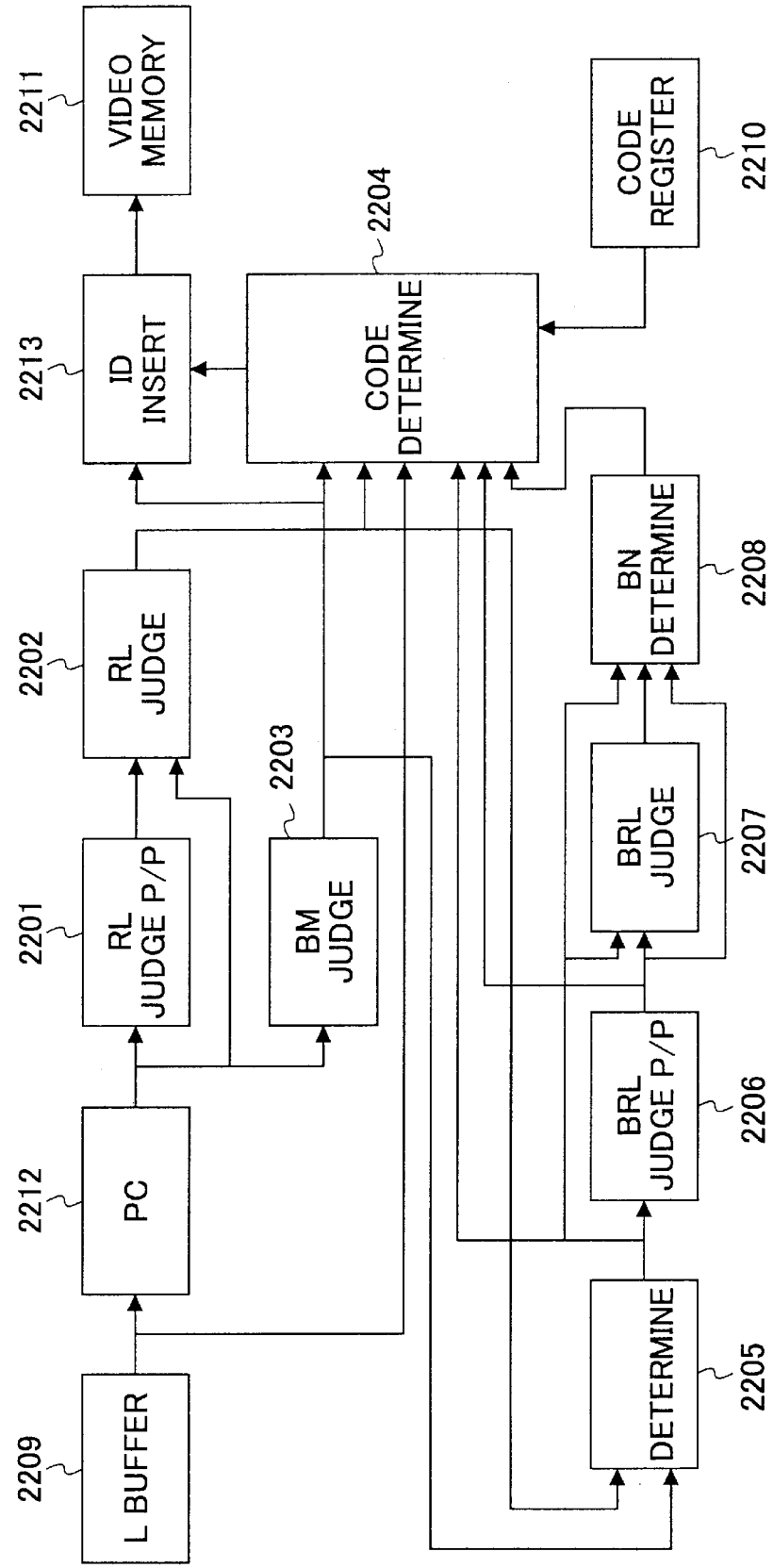
FIG. 35 is a block diagram of the image display apparatus to which a second preferred embodiment of the present invention is applied.

FIG. 35 shows the image display apparatus to which the second preferred embodiment of the present invention is applied. In addition to the elements of the image display apparatus of the first preferred embodiment, the image display apparatus of the present embodiment further includes an identifying data inserting circuit (ID INSERT) 2213.

Figure 36:
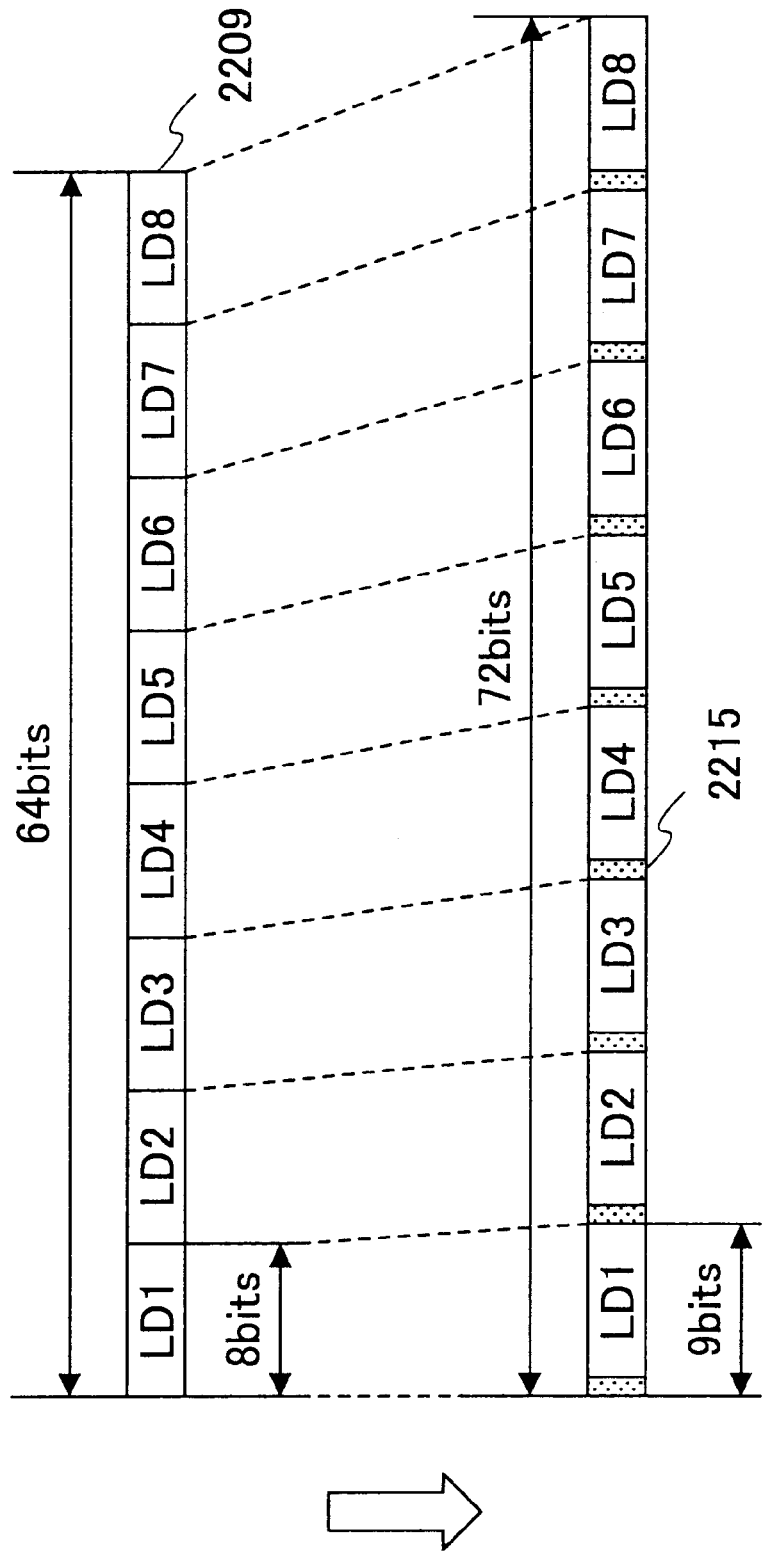
FIG. 36 is a diagram for explaining a structure of display data stored in a video memory in the image display apparatus of the second preferred embodiment.

As shown in FIG. 36, in the second preferred embodiment, an identifying data 2215 for discriminating the run-length code representing a run length and the bit map code is inserted to the MSB (most significant bit) of each image data stored in the video memory 2211. Therefore, the data width that is treated at a time is set to 9 bits for each line.

Each identifying data 2215 is inserted to the output of the code determination circuit 2204 by the identifying data inserting circuit 2213. The output signals BM1–BM8 from the BM judgment circuit 2203 are supplied to the identifying data insertion circuit 2213. For example, when BM1 is truth, "1" is inserted to the MSB of the line portion data LD1. On the contrary, when BM1 is false, "0" is inserted to the MSB of the run-length code.

In the present embodiment, the image display apparatus is provided with the identifying data inserting circuit 2213, and when the data stored in the video memory is decoded, it can discriminate immediately whether it is the run-length code or a bit-map data, based on the identifying data. In the image display apparatus of the present embodiment, the data being displayed on the display screen is stored in the video memory, and the contents of the display data can be changed and used suitably.

The image display apparatus of the present embodiment is provided with the run-length judgment circuit in which the coding of image data can be performed instantaneously, and it is possible to encode the data being displayed on the display screen very speedily, and store it into the video memory.

In the image display apparatus which edits and uses the data of the video memory suitably, when the contents of the display are changed or when the data stored in the video memory is read and decoded, the run-length code and the bitmap data can be discriminated immediately. Namely, when the data stored in the video memory is read and decoded, the run-length code and the bitmap data can be discriminated immediately.

Next, a description will be given of a third preferred embodiment of the present invention with reference to FIG. 37.

Figure 37:
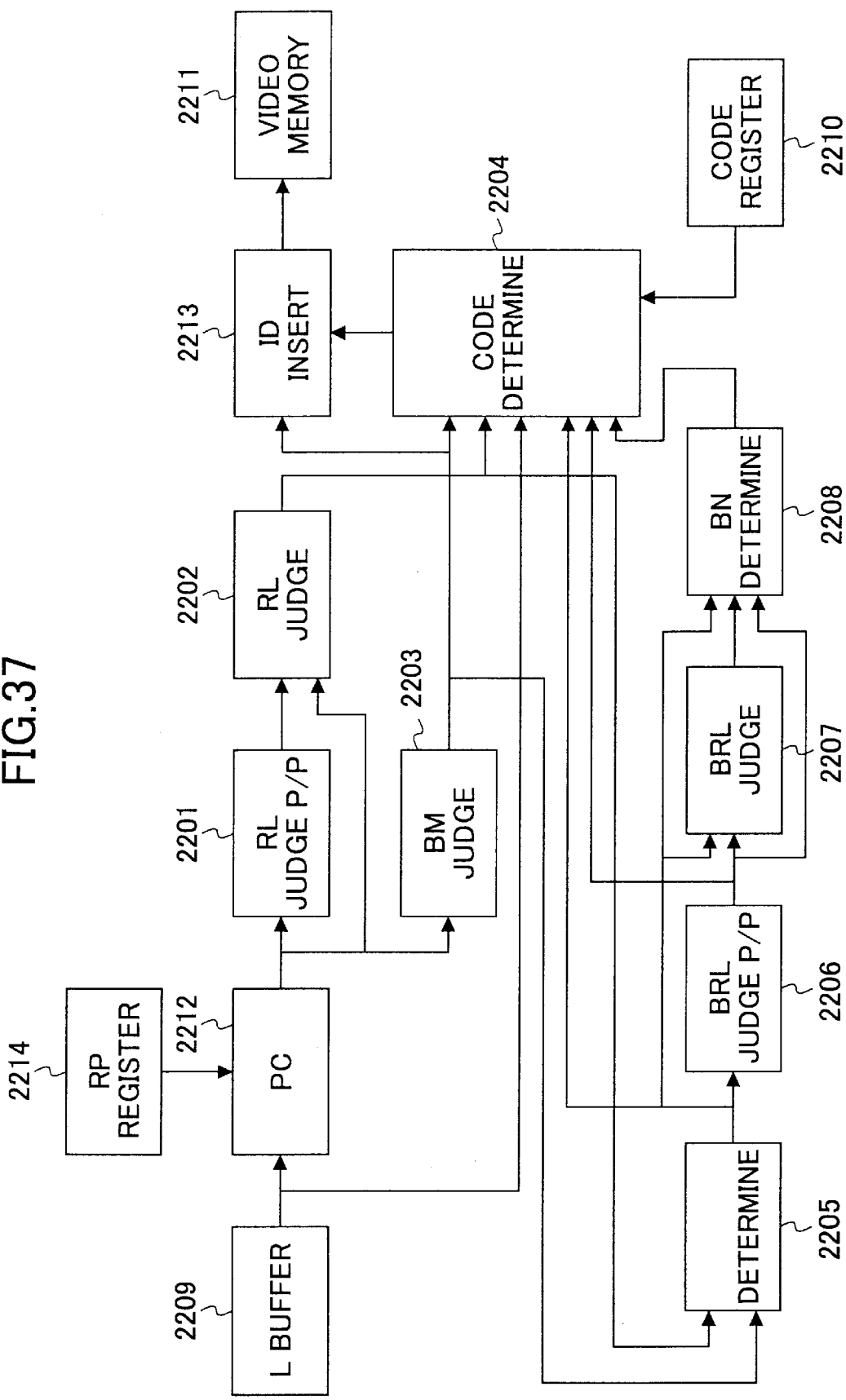
FIG. 37 is a block diagram of the image display apparatus to which a third preferred embodiment of the present invention is applied.

FIG. 37 shows the image display apparatus to which the third preferred embodiment of the present invention is applied.

In addition to the elements of the image display apparatus of the second preferred embodiment, the image display apparatus of the present embodiment further includes a reference pattern register (RP REGISTER) 2214.

The reference pattern register 2214 is provided to change the reference pattern which is used in the pattern matching processing by the pattern comparator unit 2212. The reference pattern register 2214 can store an arbitrary reference pattern that is used in the pattern matching with each of the line portion data LD1–LD8 from the line buffer 2209.

The contents of the reference pattern register 2214 can be changed and stored into the reference pattern register 2214 through software processing of the image display apparatus or the like.

For example, when storing a texture-pattern or check-pattern image data into the video memory, a reference pattern having a repetition of "0" and "1" or a repetition of "1" and "0" is once stored into the reference pattern register 2214, and the reference pattern from the register 2214 is provided to the pattern comparator unit 2212, in order for the pattern matching of the line portion data and the reference pattern.

In addition, the present invention is not limited to the above-mentioned embodiment. For example, the number of pattern comparators may be changed and the reference pattern in each pattern comparator may be changed.

According to the image display apparatus of the present embodiment, the reference pattern can be flexibly set up according to the tendency of the pattern of display data. Therefore, the reference pattern in an optimal format for the display data pattern can be used, and the rate of compression of image data can be improved.

According to the image display apparatus of the present embodiment, in the determination of a data pattern, the user can freely set up a predetermined reference pattern which is referred to by the pattern comparator unit. Namely, the predetermined reference pattern to be stored in the reference pattern register 2214 is set up through the software processing etc. from the external CPU, so that it may be suitable for the pattern of display data stored in the video memory in any of various applications. Therefore, the predetermined reference pattern which is used in the pattern matching can be optimized, and the rate of compression of the image data stored in the video memory can be improved.

The present invention is not limited to the above-described embodiments, and variations and modifications may be made without departing from the scope of the present invention.

Further, the present invention is based on Japanese priority application No. 2001-206448, filed on Jul. 6, 2001, and Japanese priority application No. 2001-280647, filed on Sep. 14, 2001 the entire contents of which are hereby incorporated by reference.

What is claimed is:

1. An image display apparatus which encodes image data and stores the encoded image data into a video memory, and reads the image data from the video memory and decodes the read image data, comprising:
 - a line buffer unit storing binary image data which is received at an input thereof, the binary image data being divided into a plurality of line portion data, each line portion data having a fixed length;
 - a plurality of pattern matching units connected in parallel with the line buffer unit and receiving the plurality of line portion data respectively, each pattern matching unit determining whether an input pattern of a related line portion data matches with a corresponding one of a plurality of reference patterns, wherein, when the match occurs each pattern matching unit outputs a truth signal indicating a value one, and otherwise each pattern matching unit outputs a false signal indicating a value zero; and
 - a judgment unit receiving the truth or false signals from the plurality of pattern matching units and determining how many times the match with respect to one of the plurality of reference patterns occurs in succession, based on the received signals, the judgment unit encoding lengths of runs for the plurality of line portion data having the fixed length based on results of the determination and storing the codes in the video memory.

2. The image display apparatus according to claim 1 further comprising a reference pattern changing unit changing setting of the plurality of reference patterns, used by the plurality of pattern matching units when performing the pattern matching, to a predetermined setting.

3. The image display apparatus according to claim 1 further comprising an identifying data inserting unit inserting an identifying data, which discriminates a run-length code and a bit-map data, to each of the codes output from the judgment unit.

4. The image display apparatus according to claim 2 wherein the reference pattern changing unit comprises a reference pattern register storing a desired reference pattern that is supplied to one of the plurality of pattern matching units.

5. An image display apparatus which encodes image data and stores the encoded image data into a video memory, and reads the image data from the video memory and decodes the read image data, comprising:
 - line buffer means for storing binary image data which is received at an input thereof, the binary image data being divided into a plurality of line portion data, each line portion data having a fixed length;
 - a plurality of pattern matching means connected in parallel with the line buffer means for receiving the plurality of line portion data respectively, each pattern matching means determining whether an input pattern of a related line portion data matches with a corresponding one of a plurality of reference patterns, wherein, when the match occurs each pattern matching means outputs a truth signal indicating the a one, and otherwise each pattern matching means outputs a false signal indicating a value zero; and
 - judgment means for receiving the truth or false signals from the plurality of pattern matching means and for determining how many times the match with respect to one of the plurality of reference patterns occurs in succession, based on the received signals, the judgment means encoding lengths of runs for the plurality of line portion data having the fixed length based on results of the determination and storing the codes in the video memory.

6. The image display apparatus according to claim 5 further comprising reference pattern changing means for changing setting of the plurality of reference patterns, used by the plurality of pattern matching means when performing the pattern matching, to a predetermined setting.

7. The image display apparatus according to claim 5 further comprising identifying data inserting means for inserting an identifying data, which discriminates a run-length code and a bit-map data, to each of the codes output from the judgment means.

8. The image display apparatus according to claim 6 wherein the reference pattern changing means comprises a reference pattern register storing a desired reference pattern that is supplied to one of the plurality of pattern matching means.

* * * * *

UNITED STATES PATENT AND TRADEMARK OFFICE
CERTIFICATE OF CORRECTION

PATENT NO. : 6,771,273 B2
DATED : August 3, 2004
INVENTOR(S) : Miura

It is certified that error appears in the above-identified patent and that said Letters Patent is hereby corrected as shown below:

Title page,
Item [75], Inventors, should read:
-- [75] Inventor: Mikio Miura, Sagamihara (JP) --

Signed and Sealed this

Nineteenth Day of October, 2004

JON W. DUDAS
*Director of the United States Patent and Trademark Office*